(12) United States Patent
Cordoba et al.

US012492410B2

(10) Patent No.: US 12,492,410 B2
(45) Date of Patent: Dec. 9, 2025

(54) ENGINEERED CYTOLYTIC IMMUNECELL

(71) Applicant: Autolus Limited, London (GB)

(72) Inventors: Shaun Cordoba, London (GB);
Shimobi Onuoha, London (GB);
Alexander Kinna, London (GB);
Simon Thomas, London (GB); Ram Jha, London (GB); Martin Pulé, London (GB)

(73) Assignee: AUTOLUS LIMITED, London (GB)

( * ) Notice: Subject to any disclaimer, the term of this patent is extended or adjusted under 35 U.S.C. 154(b) by 755 days.

(21) Appl. No.: 17/823,003

(22) Filed: Aug. 29, 2022

(65) Prior Publication Data
US 2023/0090553 A1    Mar. 23, 2023

Related U.S. Application Data

(63) Continuation of application No. 17/046,243, filed as application No. PCT/GB2019/051031 on Apr. 9, 2019, now abandoned.

(30) Foreign Application Priority Data

Apr. 10, 2018    (GB) ...................................... 1805918

(51) Int. Cl.
| | |
|---|---|
| *C12N 15/85* | (2006.01) |
| *A61K 40/11* | (2025.01) |
| *A61K 40/31* | (2025.01) |
| *C07K 14/725* | (2006.01) |
| *C12N 5/0783* | (2010.01) |
| *G01N 33/50* | (2006.01) |

(52) U.S. Cl.
CPC .............. *C12N 15/85* (2013.01); *A61K 40/11* (2025.01); *A61K 40/31* (2025.01); *C07K 14/7051* (2013.01); *C12N 5/0636* (2013.01); *G01N 33/5011* (2013.01); *G01N 33/5014* (2013.01); *A61K 2239/31* (2023.05); *A61K 2239/48* (2023.05); *C07K 2317/569* (2013.01); *C12N 2510/00* (2013.01)

(58) Field of Classification Search
None
See application file for complete search history.

(56) References Cited

U.S. PATENT DOCUMENTS

| | | | |
|---|---|---|---|
| 7,052,906 | B1 | 5/2006 | Lawson et al. |
| 10,654,927 | B2 * | 5/2020 | Pulé ................. C07K 14/70514 |
| 11,466,070 | B2 | 10/2022 | Pulé et al. |
| 12,187,769 | B2 * | 1/2025 | Pulé ....................... C12N 15/62 |
| 2017/0081411 | A1 | 3/2017 | Engels et al. |
| 2018/0086831 | A1 | 3/2018 | Pule et al. |
| 2019/0330299 | A1 | 10/2019 | Pulé et al. |
| 2020/0188434 | A1 | 6/2020 | Cordoba et al. |
| 2020/0338124 | A1 | 10/2020 | Cordoba et al. |
| 2024/0091357 | A1 | 3/2024 | Pulé et al. |

FOREIGN PATENT DOCUMENTS

| | | | |
|---|---|---|---|
| CN | 107207621 A | 9/2017 | |
| JP | 2002535959 A | 10/2002 | |
| JP | 2017526361 A | 9/2017 | |
| WO | WO-00/23602 A2 | 4/2000 | |
| WO | WO-2016/17440 A1 | 2/2016 | |
| WO | WO-2016030691 A1 * | 3/2016 | ............. A61P 35/00 |
| WO | WO-2016/135470 A1 | 9/2016 | |
| WO | WO-2016/174405 A1 | 11/2016 | |
| WO | WO-2016/174406 A1 | 11/2016 | |
| WO | WO-2016/174407 A1 | 11/2016 | |
| WO | WO-2016/174408 A1 | 11/2016 | |
| WO | WO-2016/174409 A1 | 11/2016 | |
| WO | WO-2017/137758 A1 | 8/2017 | |
| WO | WO-2018/211244 A1 | 11/2018 | |
| WO | WO-2018/211245 A1 | 11/2018 | |
| WO | WO-2021/069915 | 4/2021 | |

OTHER PUBLICATIONS

Gao, et al., J Env Sci and Health, Part B, 2013, 48, 92-100 (Year: 2013).*
U.S. Appl. No. 17/767,806, filed Apr. 8, 2022.
Chmielewski et al., "CAR T Cells Transform to Trucks: Chimeric Antigen Receptor-Redirected T Cells Engineered to Deliver Inducible IL-12 Modulate the Tumour Stroma to Combat Cancer," Cancer Immunology Immunotherapy, 61:1269-1277 (2012).
Chmielewski et al., "IL-12 Release by Engineered T Cells Expressing Chimeric Antigen Receptors can Effectively Muster an Antigen-Independent Macrophage Response on Tumor Cells That Have Shut Down Tumor Antigen Expression," Cancer Res. 71, 5697-5706 (2011).
Chmielewski et al., "Of CARs and Trucks: Chimeric Antigen Receptor (CAR) T Cells Engineered with an Inducible Cytokine to Modulate the Tumor Stroma," Immunological Reviews, 257:83-90 (2014).

(Continued)

*Primary Examiner* — Misook Yu
*Assistant Examiner* — Samantha Lake Hopkins
(74) *Attorney, Agent, or Firm* — MARSHALL, GERSTEIN & BORUN LLP

(57) ABSTRACT

The present invention relates to engineered a cytolytic immune cell comprising: i) a releasable protein which comprises a polypeptide of interest (POI) and a first interaction domain; and ii) a retention protein which is retained within an intracellular compartment of the cell and comprises a second interaction domain which binds to the first protein interaction domain, wherein binding between the first protein interaction domain and second protein interaction domain is disrupted by the presence of an agent, such that in the absence of the agent, the first protein interaction domain and second protein interaction domain bind and result in retention of the POI within an intracellular compartment; whereas in the presence of the agent, the first protein interaction domain and second protein interaction do not bind and the POI is released from the intracellular compartment and expressed at the cell surface or secreted by the cell.

6 Claims, 7 Drawing Sheets

Specification includes a Sequence Listing.

(56) References Cited

OTHER PUBLICATIONS

Donnelly et al., "The cleavage activities of foot-and-mouth disease virus 2A site-directed mutants and naturally occurring 2A-like sequences," J. Gen. Virol. 82:1027-1041 (2001).
International Search Report and Written Opinion from International Application No. PCT/GB2019/051031 dated Sep. 19, 2019.
Kuo et al., "Structural insights into TDP-43 in nucleic-acid binding and domain interactions," Nucleic Acids Res. ; 37(6):1778-88 (2009).
Rivera et al., "Regulation of Protein Secretion through Controlled Aggregation in the Endoplasmic Reticulum," Science, 287:826-830 (2000).
White et al., "Protein-protein interactions as targets for small-molecular therapeutics in cancer," Expert Rev. Mol. Med. 10:e8, 14 pages (2008).
Casset F., et al., "A Peptide Mimetic of an anti-CD4 Monoclonal Antibody by Rational Design", Biochemical and Biophysical Research Communications, vol. 307, 2003, pp. 198-205.
Edwards B.M., et al., "The Remarkable Flexibility of the Human Antibody Repertoire; Isolation of Over One Thousand Different Antibodies to a Single Protein, BlyS," Journal of Molecular Biology, 2003, vol. 334, pp. 103-118.
Goel M., et al., "Plasticity within the Antigen-Combining Site May Manifest as Molecular Mimicry in the Humoral Immune Response," Journal of Immunology, 2004, vol. 173, pp. 7358-7367.
Luckner S.R., et al., "How an Agonist Peptide Mimics the Antibiotic Tetracycline to Induce Tet-Repressor," Journal of Molecular Biology, Academic Press, UK, doi:10.1016/J.JMB.2007.02.030, ISSN 0022-2836, XP022020037, 2007, vol. 368 (3), pp. 780-790.
MacCallum R.M., et al., "Antibody-antigen Interactions: Contact Analysis and Binding Site Topography", Journal of Molecular Biology, vol. 262, 1996, pp. 732-745.
Panka D.J., et al., "Variable Region Framework Differences Result in Decreased or Increased Affinity of Variant Anti-Digoxin Antibodies", Proceedings of the National Academy of Sciences USA, vol. 85, May 1988, pp. 3080-3084.
Poosarla V.G., et al., "Computational De Novo Design of Antibodies Binding to a Peptide With High Affinity," Biotechnology and Bioengineering, Jun. 2017, vol. 114 (6), pp. 1331-1342.
Rudikoff S., et al., "Single Amino Acid Substitution Altering Antigen-Binding Specificity", Immunology, Proceedings of the National Academy of Sciences, 1982, vol. 79, pp. 1979-1983.

\* cited by examiner

SEQUENCE LISTING

```
Sequence total quantity: 46
SEQ ID NO: 1             moltype = AA  length = 207
FEATURE                  Location/Qualifiers
REGION                   1..207
                         note = TetR amino acid sequence
source                   1..207
                         mol_type = protein
                         organism = synthetic construct
SEQUENCE: 1
MSRLDKSKVI NSALELLNEV GIEGLTTRKL AQKLGVEQPT LYWHVKNKRA LLDALAIEML   60
DRHHTHFCPL EGESWQDFLR NNAKSFRCAL LSHRDGAKVH LGTRPTEKQY ETLENQLAFL  120
CQQGFSLENA LYALSAVGHF TLGCVLEDQE HQVAKEERET PTTDSMPPLL RQAIELFDHQ  180
GAEPAFLFGL ELIICGLEKQ LKCESGS                                     207

SEQ ID NO: 2             moltype = AA  length = 12
FEATURE                  Location/Qualifiers
REGION                   1..12
                         note = TiP amino acid sequence
source                   1..12
                         mol_type = protein
                         organism = synthetic construct
SEQUENCE: 2
MWTWNAYAFA AP                                                      12
```

```
SEQ ID NO: 3            moltype = AA   length = 17
FEATURE                 Location/Qualifiers
REGION                  1..17
                        note = TiP amino acid sequence and a serine-glycine linker
source                  1..17
                        mol_type = protein
                        organism = synthetic construct
SEQUENCE: 3
MWTWNAYAFA APSGGGS                                                          17

SEQ ID NO: 4            moltype = DNA   length = 30
FEATURE                 Location/Qualifiers
misc_feature            1..30
                        note = NFAT response element
source                  1..30
                        mol_type = other DNA
                        organism = synthetic construct
SEQUENCE: 4
ggaggaaaaa ctgtttcata cagaaggcgt                                            30

SEQ ID NO: 5            moltype = AA   length = 555
FEATURE                 Location/Qualifiers
REGION                  1..555
                        note = releasable protein sequence
source                  1..555
                        mol_type = protein
                        organism = synthetic construct
SEQUENCE: 5
METDTLLLWV LLLWVPGSTG MWTWNAYAFA APSGGGSIWE LKKDVYVVEL DWYPDAPGEM   60
VVLTCDTPEE DGITWTLDQS SEVLGSGKTL TIQVKEFGDA GQYTCHKGGE VLSHSLLLLH  120
KKEDGIWSTD ILKDQKEPKN KTFLRCEAKN YSGRFTCWWL TTISTDLTFS VKSSRGSSDP  180
QGVTCGAATL SAERVRGDNK EYEYSVECQE DSACPAAEES LPIEVMVDAV HKLKYENYTS  240
SFFIRDIIKP DPPKNLQLKP LKNSRQVEVS WEYPDTWSTP HSYFSLTFCV QVQGKSKREK  300
KDRVFTDKTS ATVICRKNAS ISVRAQDRYY SSSWSEWASV PCSGGGGSGG GGSGGGGSRN  360
LPLATPDPGM FPCLHHSQNL LRAVSNMLQK ARQTLEFYPC TSEEIDHEDI TKDKTSTVEA  420
CLPLELTKNE SCLNSRETSF ITNGSCLASR KTSFMMALCL SSIYEDSKMY QVEFKTMNAK  480
LLMDPKRQIF LDQNMLAVID ELMQALNFNS ETVPQKSSLE EPDFYKTKIK LCILLHAFRI  540
RAVTIDRVMS YLNAS                                                  555

SEQ ID NO: 6            moltype = AA   length = 555
FEATURE                 Location/Qualifiers
REGION                  1..555
                        note = releasable protein sequence
source                  1..555
                        mol_type = protein
                        organism = synthetic construct
SEQUENCE: 6
METDTLLLKV LLLWVPGSTG MWTWNAYAFA APSGGGSIWE LKKDVYVVEL DWYPDAPGEM   60
VVLTCDTPEE DGITWTLDQS SEVLGSGKTL TIQVKEFGDA GQYTCHKGGE VLSHSLLLLH  120
KKEDGIWSTD ILKDQKEPKN KTFLRCEAKN YSGRFTCWWL TTISTDLTFS VKSSRGSSDP  180
QGVTCGAATL SAERVRGDNK EYEYSVECQE DSACPAAEES LPIEVMVDAV HKLKYENYTS  240
SFFIRDIIKP DPPKNLQLKP LKNSRQVEVS WEYPDTWSTP HSYFSLTFCV QVQGKSKREK  300
KDRVFTDKTS ATVICRKNAS ISVRAQDRYY SSSWSEWASV PCSGGGGSGG GGSGGGGSRN  360
LPLATPDPGM FPCLHHSQNL LRAVSNMLQK ARQTLEFYPC TSEEIDHEDI TKDKTSTVEA  420
CLPLELTKNE SCLNSRETSF ITNGSCLASR KTSFMMALCL SSIYEDSKMY QVEFKTMNAK  480
LLMDPKRQIF LDQNMLAVID ELMQALNFNS ETVPQKSSLE EPDFYKTKIK LCILLHAFRI  540
RAVTIDRVMS YLNAS                                                  555

SEQ ID NO: 7            moltype = AA   length = 237
FEATURE                 Location/Qualifiers
REGION                  1..237
                        note = retention protein sequence
source                  1..237
                        mol_type = protein
                        organism = synthetic construct
SEQUENCE: 7
MGWSCIILFL VATATGVHSM SRLDKSKVIN SALELLNEVG IEGLTTRKLA QKLGVEQPTL   60
YWHVKNKRAL LDALAIEMLD RHHTHFCPLE GESWQDFLRN NAKSFRCALL SHRDGAKVHL  120
GTRPTEKQYE TLENQLAFLC QQGFSLENAL YALSAVGHFT LGCVLEDQEH QVAKEERETP  180
TTDSMPPLLR QAIELFDHQG AEPAFLFGLE LIICGLEKQL KCESGSSGGG GSEKDEL     237

SEQ ID NO: 8            moltype = AA   length = 169
FEATURE                 Location/Qualifiers
REGION                  1..169
                        note = domain antibody which binds minocycline
source                  1..169
                        mol_type = protein
                        organism = synthetic construct
SEQUENCE: 8
```

```
MKYLLPTAAA GLLLLAAQPA MAQVQLQESG GGLVQPGSSL RLSCAASGRT FSSYNIGWFR   60
QAPGKEREFV AAISWSGART YYADSVKGRF TISRDNAKNT VYLQMNSLKP EDTAVYSCAA  120
GRGWGTEAIL DYWGQGTQVT VSSAAAHHHH HHGAAEQKLI SEEDLNGAA              169

SEQ ID NO: 9               moltype = AA   length = 169
FEATURE                    Location/Qualifiers
REGION                     1..169
                           note = domain antibody which binds minocycline
source                     1..169
                           mol_type = protein
                           organism = synthetic construct
SEQUENCE: 9
MKYLLPTAAA GLLLLAAQPA MAQVQLQESG GGLVQAGDSL RLSCSASGRS LSSYVMGWFR   60
QAPGKEREFV AAISWSGART YYADSVKGRF TISRDNAKNT VYLQMNSLKP EDTAVYRCAA  120
GRGWGTEAIL DYWGQGTQVT VSSAAAHHHH HHGAAEQKLI SEEDLNGAA              169

SEQ ID NO: 10              moltype = AA   length = 163
FEATURE                    Location/Qualifiers
REGION                     1..163
                           note = domain antibody which binds minocycline
source                     1..163
                           mol_type = protein
                           organism = synthetic construct
SEQUENCE: 10
MKYLLPTAAA GLLLLAAQPA MAQVQLQESG GGLVQAGGSL RLACVASGNI GLVSVMDWYR   60
QVPGKERELV ATITGGRTN YADSVKGRFT ISMDYAKATV YLQMNNLQPE DTAVYYCRLV  120
SSGRAFWGQG TQVTVSSAAA HHHHHHGAAE QKLISEEDLN GAA                   163

SEQ ID NO: 11              moltype = AA   length = 169
FEATURE                    Location/Qualifiers
REGION                     1..169
                           note = domain antibody which binds minocycline
source                     1..169
                           mol_type = protein
                           organism = synthetic construct
SEQUENCE: 11
MKYLLPTAAA GLLLLAAQPA MAQVQLQESG GGLVQAGGSL RLSCAASGRT FSSYNIGWFR   60
QAPGKEREFV AAISWSGART YYADSVKGRF TISRDNAKNT VYLQMNSLKP EDTAVYYCVA  120
GRGWGTEAIL DYWGQGTQVT VSSAAAHHHH HHGAAEQKLI SEEDLNGAA              169

SEQ ID NO: 12              moltype = AA   length = 169
FEATURE                    Location/Qualifiers
REGION                     1..169
                           note = domain antibody which binds minocycline
source                     1..169
                           mol_type = protein
                           organism = synthetic construct
SEQUENCE: 12
MKYLLPTAAA GLLLLAAQPA MAQVQLQESG GGLVQAGGSL RLSCAASGRT FSRYNIGWFR   60
QAPGKEREFV AAISWSGART YYADSVKGRF TISRDNAKNT VYLQMNSLKP EDTAVYYCAA  120
GRGWGTEAIL DYWGQGTQVT VSSAAAHHHH HHGAAEQKLI SEEDLNGAA              169

SEQ ID NO: 13              moltype = AA   length = 163
FEATURE                    Location/Qualifiers
REGION                     1..163
                           note = domain antibody which binds minocycline
source                     1..163
                           mol_type = protein
                           organism = synthetic construct
SEQUENCE: 13
MKYLLPTAAA GLLLLAAQPA MAQVQLQESG GGLVQAGGSL RLACVASGNI GLVSVMDWYR   60
QVPGKERELV ATITGGGSTN YSDSVKGRFT ISMDYAKSTI YLQMNSLKPE DTAVYYCRLV  120
NNGRPFWGQG TQVTVSSAAA HHHHHHGAAE QKLISEEDLN GAA                   163

SEQ ID NO: 14              moltype = AA   length = 246
FEATURE                    Location/Qualifiers
REGION                     1..246
                           note = PD1 blocking antibody (clone 5C4)
source                     1..246
                           mol_type = protein
                           organism = synthetic construct
SEQUENCE: 14
MALPVTALLL PLALLLHAAR PEIVLTQSPA TLSLSPGERA TLSCRASQSV SSYLAWYQQK   60
PGQAPRLLIY DASNRATGIP ARFSGSGSGT DFTLTIEDFA VYYCQQSTFG QGTKVEIKGG  120
GGSGGGGSGG GGSQVYLVES GGGVVQPGRS LRLSCAASGF TFSNYGMHWV RQAPGKGLEW  180
VALIWYDGSN KYYADSVKGR FTISRDNSKN TLYLQMTSLR VEDTAVYYCA SNVDHWGQGT  240
LVTVSS                                                            246

SEQ ID NO: 15              moltype = AA   length = 163
```

```
FEATURE                 Location/Qualifiers
REGION                  1..163
                        note = OX40 agonist (a trimeric coiled coil OX40L)
source                  1..163
                        mol_type = protein
                        organism = synthetic construct
SEQUENCE: 15
ACGCAAAPDV KDLLSRLEEL EGLVSSLREQ QVSHRYPRIQ SIKVQFTEYK KEKGFILTSQ    60
KEDEIMKVQN NSVIINCDGF YLISLKGYFS QEVNISLHYQ KDEEPLFQLK KVRSVNSLMV   120
ASLTYKDKVY LNVTTDNTSL DDFHVNGGEL ILIHQNPGEF CVL                    163

SEQ ID NO: 16           moltype = AA   length = 235
FEATURE                 Location/Qualifiers
REGION                  1..235
                        note = 41BB agonist (a trimeric coiled coil 41BBL)
source                  1..235
                        mol_type = protein
                        organism = synthetic construct
SEQUENCE: 16
ACGCAAAPDV KDLLSRLEEL EGLVSSLREQ ACPWAVSGAR ASPGSAASPR LREGPELSPD    60
DPAGLLDLRQ GMFAQLVAQN VLLIDGPLSW YSDPGLAGVS LTGGLSYKED TKELVVAKAG   120
VYYVFFQLEL RRVVAGEGSG SVSLALHLQP LRSAAGAAL ALTVDLPPAS SEARNSAFGF    180
QGRLLHLSAG QRLGVHLHTE ARARHAWQLT QGATVLGLFR VTPEIPAGLP SPRSE        235

SEQ ID NO: 17           moltype = AA   length = 219
FEATURE                 Location/Qualifiers
REGION                  1..219
                        note = IL-12 alpha subunit
source                  1..219
                        mol_type = protein
                        organism = synthetic construct
SEQUENCE: 17
MCPARSLLLV ATLVLLDHLS LARNLPVATP DPGMFPCLHH SQNLLRAVSN MLQKARQTLE    60
FYPCTSEEID HEDITKDKTS TVEACLPLEL TKNESCLNSR ETSFITNGSC LASRKTSFMM   120
ALCLSSIYED LKMYQVEFKT MNAKLLMDPK RQIFLDQNML AVIDELMQAL NFNSETVPQK   180
SSLEEPDFYK TKIKLCILLH AFRIRAVTID RVMSYLNAS                         219

SEQ ID NO: 18           moltype = AA   length = 328
FEATURE                 Location/Qualifiers
REGION                  1..328
                        note = IL-12 beta subunit
source                  1..328
                        mol_type = protein
                        organism = synthetic construct
SEQUENCE: 18
MCHQQLVISW FSLVFLASPL VAIWELKKDV YVVELDWYPD APGEMVVLTC DTPEEDGITW    60
TLDQSSEVLG SGKTLTIQVK EFGDAGQYTC HKGGEVLSHS LLLLHKKEDG IWSTDILKDQ   120
KEPKNKTFLR CEAKNYSGRF TCWWLTTIST DLTFSVKSSR GSSDPQGVTC GAATLSAERV   180
RGDNKEYEYS VECQEDSACP AAEESLPIEV MVDAVHKLKY ENYTSSFFIR DIIKPDPPKN   240
LQLKPLKNSR QVEVSWEYPD TWSTPHSYFS LTFCVQVQGK SKREKKDRVF TDKTSATVIC   300
RKNASISVRA QDRYYSSSWS EWASVPCS                                    328

SEQ ID NO: 19           moltype = AA   length = 518
FEATURE                 Location/Qualifiers
REGION                  1..518
                        note = flexi IL-12
source                  1..518
                        mol_type = protein
                        organism = synthetic construct
SEQUENCE: 19
IWELKKDVYV VELDWYPDAP GEMVVLTCDT PEEDGITWTL DQSSEVLGSG KTLTIQVKEF    60
GDAGQYTCHK GGEVLSHSLL LLHKKEDGIW STDILKDQKE PKNKTFLRCE AKNYSGRFTC   120
WWLTTISTDL TFSVKSSRGS SDPQGVTCGA ATLSAERVRG DNKEYEYSVE CQEDSACPAA   180
EESLPIEVMV DAVHKLKYEN YTSSFFIRDI IKPDPPKNLQ LKPLKNSRQV EVSWEYPDTW   240
STPHSYFSLT FCVQVQGKSK REKKDRVFTD KTSATVICRK NASISVRAQD RYYSSSWSEW   300
ASVPCSGGGG SGGGGSGGGG SRNLPLATPD PGMFPCLHHS QNLLRAVSNM LQKARQTLEF   360
YPCTSEEIDH EDITKDKTST VEACLPLELT KNESCLNSRE TSFITNGSCL ASRKTSFMMA   420
LCLSSIYEDS KMYQVEFKTM NAKLLMDPKR QIFLDQNMLA VIDELMQALN FNSETVPQKS   480
SLEEPDFYKT KIKLCILLHA FRIRAVTIDR VMSYLNAS                          518

SEQ ID NO: 20           moltype = AA   length = 177
FEATURE                 Location/Qualifiers
REGION                  1..177
                        note = IL-7 sequence
source                  1..177
                        mol_type = protein
                        organism = synthetic construct
SEQUENCE: 20
MFHVSFRYIF GLPPLILVLL PVASSDCDIE GKDGKQYESV LMVSIDQLLD SMKEIGSNCL    60
```

```
NNEFNFFKRH ICDANKEGMF LFRAARKLRQ FLKMNSTGDF DLHLLKVSEG TTILLNCTGQ  120
VKGRKPAALG EAQPTKSLEE NKSLKEQKKL NDLCFLKRLL QEIKTCWNKI LMGTKEH     177

SEQ ID NO: 21           moltype = AA  length = 162
FEATURE                 Location/Qualifiers
REGION                  1..162
                        note = IL-15 sequence
source                  1..162
                        mol_type = protein
                        organism = synthetic construct
SEQUENCE: 21
MRISKPHLRS ISIQCYLCLL LNSHFLTEAG IHVFILGCFS AGLPKTEANW VNVISDLKKI  60
EDLIQSMHID ATLYTESDVH PSCKVTAMKC FLLELQVISL ESGDASIHDT VENLIILANN  120
SLSSNGNVTE SGCKECEELE EKNIKEFLQS FVHIVQMFIN TS                    162

SEQ ID NO: 22           moltype = AA  length = 155
FEATURE                 Location/Qualifiers
REGION                  1..155
                        note = IL-21 sequence
source                  1..155
                        mol_type = protein
                        organism = synthetic construct
SEQUENCE: 22
MERIVICLMV IFLGTLVHKS SSQGQDRHMI RMRQLIDIVD QLKNYVNDLV PEFLPAPEDV  60
ETNCEWSAFS CFQKAQLKSA NTGNNERIIN VSIKKLKRKP PSTNAGRRQK HRLTCPSCDS  120
YEKKPPKEFL ERFKSLLQKM IHQHLSSRTH GSEDS                            155

SEQ ID NO: 23           moltype = AA  length = 98
FEATURE                 Location/Qualifiers
REGION                  1..98
                        note = IL-CCL19 sequence
source                  1..98
                        mol_type = protein
                        organism = synthetic construct
SEQUENCE: 23
MALLLALSLL VLWTSPAPTL SGTNDAEDCC LSVTQKPIPG YIVRNFHYLL IKDGCRVPAV  60
VFTTLRGRQL CAPPDQPWVE RIIQRLQRTS AKMKRRSS                         98

SEQ ID NO: 24           moltype = AA  length = 567
FEATURE                 Location/Qualifiers
REGION                  1..567
                        note = diphtheria toxin
source                  1..567
                        mol_type = protein
                        organism = synthetic construct
SEQUENCE: 24
MLVRGYVVSR KLFASILIGA LLGIGAPPSA HAGADDVVDS SKSFVMENFS SYHGTKPGYV  60
DSIQKGIQKP KSGTQGNYDD DWKGFYSTDN KYDAAGYSVD NENPLSGKAG GVVKVTYPGL  120
TKVLALKVDN AETIKKELGL SLTEPLMEQV GTEEFIKRFG DGASRVVLSL PFAEGSSSVE  180
YINNWEQAKA LSVELEINFE TRGKRGQDAM YEYMAQACAG NRVRRSVGSS LSCINLDWDV  240
IRDKTKTKIE SLKEHGPIKN KMSESPNKTV SEEKAKQYLE EFHQTALEHP ELSELKTVTG  300
TNPVFAGANY AAWAVNVAQV IDSETADNLE KTTAALSILP GIGSVMGIAD GAVHHNTEEI  360
VAQSIALSSL MVAQAIPLVG ELVDIGFAAY NFVESIINLF QVVHNSYNRP AYSPGHKTQP  420
FLHDGYAVSW NTVEDSIIRT GFQGESGHDI KITAENTPLP IAGVLLPTIP GKLDVNKSKT  480
HISVNGRKIR MRCRAIDGDV TFCRPKSPVY VGNGVHANLH VAFHRSSSEK IHSNEISSDS  540
IGVLGYQKTV DHTKVNSKLS LFFEIKS                                     567

SEQ ID NO: 25           moltype = AA  length = 20
FEATURE                 Location/Qualifiers
REGION                  1..20
                        note = murine Ig kappa chain V-III region signal peptide
source                  1..20
                        mol_type = protein
                        organism = synthetic construct
SEQUENCE: 25
METDTLLLWV LLLWVPGSTG                                             20

SEQ ID NO: 26           moltype = AA  length = 20
FEATURE                 Location/Qualifiers
REGION                  1..20
                        note = murine Ig kappa chain V-III region signal peptide
source                  1..20
                        mol_type = protein
                        organism = synthetic construct
SEQUENCE: 26
METDTLLLKV LLLWVPGSTG                                             20

SEQ ID NO: 27           moltype = AA  length = 19
FEATURE                 Location/Qualifiers
```

```
REGION                   1..19
                         note = murine Ig heavy chain V region signal peptide
source                   1..19
                         mol_type = protein
                         organism = synthetic construct
SEQUENCE: 27
MGWSCIILFL VATATGVHS                                                       19

SEQ ID NO: 28            moltype = AA  length = 6
FEATURE                  Location/Qualifiers
REGION                   1..6
                         note = intracellular retention domain
source                   1..6
                         mol_type = protein
                         organism = synthetic construct
SEQUENCE: 28
SEKDEL                                                                      6

SEQ ID NO: 29            moltype = AA  length = 4
FEATURE                  Location/Qualifiers
REGION                   1..4
                         note = intracellular retention domain
source                   1..4
                         mol_type = protein
                         organism = synthetic construct
SEQUENCE: 29
KDEL                                                                        4

SEQ ID NO: 30            moltype =    length =
SEQUENCE: 30
000

SEQ ID NO: 31            moltype =    length =
SEQUENCE: 31
000

SEQ ID NO: 32            moltype = AA  length = 15
FEATURE                  Location/Qualifiers
REGION                   1..15
                         note = intracellular retention domain, tail of adenoviral
                          E19 protein
source                   1..15
                         mol_type = protein
                         organism = synthetic construct
SEQUENCE: 32
KYKSRRSFID EKKMP                                                           15

SEQ ID NO: 33            moltype = AA  length = 10
FEATURE                  Location/Qualifiers
REGION                   1..10
                         note = intracellular retention domain, fragment of HLA
                          invariant chain
source                   1..10
                         mol_type = protein
                         organism = synthetic construct
SEQUENCE: 33
MHRRRSRSCR                                                                 10

SEQ ID NO: 34            moltype = AA  length = 10
FEATURE                  Location/Qualifiers
REGION                   1..10
                         note = minocycline peptide mimic
source                   1..10
                         mol_type = protein
                         organism = synthetic construct
SEQUENCE: 34
ACPGWARAFC                                                                 10

SEQ ID NO: 35            moltype = AA  length = 10
FEATURE                  Location/Qualifiers
REGION                   1..10
                         note = minocycline peptide mimic
source                   1..10
                         mol_type = protein
                         organism = synthetic construct
SEQUENCE: 35
ACPHWAQAFC                                                                 10

SEQ ID NO: 36            moltype = AA  length = 10
```

```
FEATURE                 Location/Qualifiers
REGION                  1..10
                        note = minocycline peptide mimic
source                  1..10
                        mol_type = protein
                        organism = synthetic construct
SEQUENCE: 36
ACPQWAMMFC                                                                10

SEQ ID NO: 37           moltype = AA  length = 10
FEATURE                 Location/Qualifiers
REGION                  1..10
                        note = minocycline peptide mimic
source                  1..10
                        mol_type = protein
                        organism = synthetic construct
SEQUENCE: 37
ACPPWAYSFC                                                                10

SEQ ID NO: 38           moltype = AA  length = 8
FEATURE                 Location/Qualifiers
REGION                  1..8
                        note = complementarity determining region, CDR1
source                  1..8
                        mol_type = protein
                        organism = synthetic construct
SEQUENCE: 38
GRTFSSYN                                                                   8

SEQ ID NO: 39           moltype = AA  length = 8
FEATURE                 Location/Qualifiers
REGION                  1..8
                        note = complementarity determining region, CDR2
source                  1..8
                        mol_type = protein
                        organism = synthetic construct
SEQUENCE: 39
ISWSGART                                                                   8

SEQ ID NO: 40           moltype = AA  length = 14
FEATURE                 Location/Qualifiers
REGION                  1..14
                        note = complementarity determining region, CDR3
source                  1..14
                        mol_type = protein
                        organism = synthetic construct
SEQUENCE: 40
AAGRGWGTEA ILDY                                                           14

SEQ ID NO: 41           moltype = AA  length = 10
FEATURE                 Location/Qualifiers
REGION                  1..10
                        note = minocycline peptide mimic sequence
SITE                    4
                        note = misc_feature - Xaa can be any naturally occurring
                         amino acid
REGION                  7..8
                        note = misc_feature - Xaa can be any naturally occurring
                         amino acid
source                  1..10
                        mol_type = protein
                        organism = synthetic construct
SEQUENCE: 41
ACPXWAXXFC                                                                10

SEQ ID NO: 42           moltype = AA  length = 5
FEATURE                 Location/Qualifiers
REGION                  1..5
                        note = serine-glycine linker
source                  1..5
                        mol_type = protein
                        organism = synthetic construct
SEQUENCE: 42
SGGGS                                                                      5

SEQ ID NO: 43           moltype =   length =
SEQUENCE: 43
000
```

| | | |
|---|---|---|
| SEQ ID NO: 44 SEQUENCE: 44 000 | moltype = length = | |
| SEQ ID NO: 45 SEQUENCE: 45 000 | moltype = length = | |
| SEQ ID NO: 46 FEATURE REGION source SEQUENCE: 46 ENLYFQS | moltype = AA  length = 7 Location/Qualifiers 1..7 note = consensus Tobacco Etch Virus (TEV) cleavage site 1..7 mol_type = protein organism = synthetic construct | 7 |

ENGINEERED CYTOLYTIC IMMUNECELL

CROSS-REFERENCE TO RELATED APPLICATIONS

This is a Continuation of U.S. application Ser. No. 17/046,243, filed Oct. 8, 2020, which is a U.S. National Phase of International Application No. PCT/GB2019/051031, filed Apr. 9, 2019, which claims priority to Great Britain Application No. 1805918.8, filed Apr. 10, 2018.

INCORPORATION BY REFERENCE OF THE SEQUENCE LISTING

This application contains, as a separate part of disclosure, a Sequence Listing in computer-readable form (filename 55076A_Seqlisting.XML; 59,494 bytes created Aug. 29, 2022) which is incorporated by reference herein in its entirety.

FIELD OF THE INVENTION

The present invention relates to an engineered cytolytic immune cell which secretes a protein of interest; and in particular to methods for controllably inducing the secretion of said protein of interest.

BACKGROUND TO THE INVENTION

Engineered cell therapy has been successful in treating a number of lymphoid malignancies, such as B-cell Acute Lymphoblastic Leukaemia (B-ALL), Diffuse Large B-cell Lymphoma (DLBCL) and Multiple Myeloma (MM), however there has been relatively little success in the treatment of solid cancers. There are many reasons why solid cancers have proven to be more difficult targets for engineered cell therapy than lymphoid cancers, including access to the tumour, persistence in the face of inhibitory signals and cells and heterogeneity of tumour antigen expression. Methods of increasing the potency of engineered cell therapies are needed for the successful treatment of other cancers, such as solid cancers.

Engineered cells face hostile microenvironments. Modulating the tumour microenvironment may convert the microenvironment into a more favourable environment which enables the engineered immune cytotoxic cells to proliferate, survive and/or engraft thereby providing a more effective engineered cell therapy.

Interleukin 12 (IL-12) is a potent immunomodulatory cytokine of particular interest for modulating the tumour microenvironment redirecting the immune response against cancer. IL-12 is systemically toxic therefore methods for producing IL-12 locally have been produced (for example by Chmielewski et al., Cancer Res. 71, 5697-5706 (2011)). Transgenic T cell IL-12 production can result in highly toxic systemic levels. Zhang et al., produced autologous melanoma tumour infiltrating lymphocytes (TILs) transduced with a gene encoding a single-chain IL-12 driven by an NFAT promoter. Despite a functionally controlled IL-12 release, severe clinical and unpredictable clinical toxicity occurred including high serum levels of IL-12 and interferon gamma, clinical toxicities including liver dysfunction, high fevers and sporadic life threatening hemodynamic instability.

Accordingly, there remains a need for approaches to controllably modulate the tumour microenvironment, which may improve the effectiveness of engineered cytolytic immune cells to proliferate, survive and/or engraft in a microenvironment.

SUMMARY OF THE INVENTION

The present inventors have developed an engineered cytolytic immune cell which is capable of controllably secreting a protein of interest (such as an immune modulatory cytokine). This method allows the controllable secretion of proteins which it would be undesirable or unsafe to secrete constitutively or at systemic levels using other methods.

Engineered cytolytic immune cells of the present invention may be used to control the administration of immune-modulatory proteins to the tumour microenvironment, thereby avoiding toxic effects which may be associated with systemic administration of such proteins.

As described herein, a first protein interaction domain is operably linked to a protein of interest and a second protein interaction domain is operably linked to an intracellular retention domain. In the absence of an agent, the protein of interest is retained within the cell via a protein:protein interaction between the first and the second protein interaction domains. In the presence of an agent, the agent disrupts the protein:protein interaction between the first and the second protein interaction domains and the protein of interest is released from the intracellular compartment and secreted from the engineered cytolytic immune cell of the invention.

Thus, in one aspect, the present invention provides an engineered cytolytic immune cell comprising:
i) a releasable protein which comprises a polypeptide of interest (POI) and a first interaction domain; and
ii) a retention protein which is retained within an intracellular compartment of the cell and comprises a second interaction domain;
wherein the first protein interaction domain and second protein interaction domain are capable of a conditional interaction according to the presence or absence of an agent.

The engineered cytolytic immune cell may comprise:
i) a first nucleic acid sequence encoding a releasable protein which comprises a protein of interest (POI), a first protein interaction domain and a signal peptide; and
ii) a second nucleic acid sequence encoding a retention protein, which comprises a second protein interaction domain, an intracellular retention domain and a signal peptide;
wherein the first protein interaction domain and second protein interaction domain are capable of a conditional interaction according to the presence or absence of an agent.

The interaction between the first protein interaction domain and second protein interaction may be disrupted by the presence of an agent, such that in the absence of the agent, the first protein interaction domain and second protein interaction bind and result in retention of the POI within an intracellular compartment; whereas in the presence of the agent, the first protein interaction domain and second protein interaction do not bind and the POI is not retained within the intracellular compartment.

In this respect, the present application provides an engineered cytolytic immune cell comprising:
i) a releasable protein which comprises a polypeptide of interest (POI) and a first interaction domain; and
ii) a retention protein which is retained within an intracellular compartment of the cell and comprises a second interaction domain which binds to the first protein interaction domain, wherein binding between the first protein interaction domain and second protein interaction domain is disrupted by the presence of an agent, such that in the absence of the agent, the first protein interaction domain and second protein interaction domain bind and result in retention of the POI within an intracellular compartment; whereas in the presence of the agent, the first protein interaction domain and second protein interaction do not bind and the POI is released from the intracellular compartment and either expressed at the cell surface or secreted by the cell.

In the presence of the agent, the POI may be exported to and expressed at the cell surface.

Alternatively, in the presence of the agent, the POI may be secreted by the cell.

The interaction between the first protein interaction domain and the second protein interaction domain may be reduced or disrupted by the agent binding competitively to one of the first protein interaction domain or the second protein interaction domain.

The interaction between the first protein interaction domain and the second protein interaction domain may be disrupted by the agent binding to one of the first protein interaction domain or the second protein interaction domain with higher affinity than the interaction between the first protein interaction domain and the second protein interaction domain.

One of the first protein interaction domain or the second protein interaction domain may comprise the Tet Repressor Protein (TetR) or a variant thereof and the other of the first protein interaction domain or second protein interaction domain may comprise TetR inducing Peptide (TiP) or a variant thereof. In this case the agent may be selected from tetracycline, doxycycline, minocycline or an analogue thereof.

Suitably, the first protein interaction domain may comprise the Tet Repressor Protein (TetR) or a variant thereof and the second protein interaction domain may comprise TetR inducing Peptide (TiP) or a variant thereof. Suitably, the first protein interaction domain may comprise TetR inducing Peptide (TiP) or a variant thereof and the second protein interaction domain may comprise the Tet Repressor Protein (TetR) or a variant thereof.

The first protein interaction domain or the second protein interaction domain may be a peptide mimic of the agent.

One of the first protein interaction domain or the second protein interaction domain may be a peptide mimic of the agent and the other of the first protein interaction domain or second protein interaction domain may be capable of binding the agent and the peptide mimic, wherein the protein interaction domain binds the peptide mimic at a lower affinity than it binds the agent.

Suitably, the first protein interaction domain may be a peptide mimic of the agent and the second protein interaction domain may be capable of binding the agent and the peptide mimic, wherein the second protein interaction domain binds the peptide mimic at a lower affinity than it binds the agent. Suitably, the first protein interaction domain may capable of binding the agent and the peptide mimic and the second protein interaction domain may be a peptide mimic of the agent, wherein the first protein interaction domain binds the peptide mimic at a lower affinity than it binds the agent.

Suitably, one of the first protein interaction domain or second protein interaction domain may comprise an antibody, a single domain antibody (sdAb), a VHH/nanobody, a nanobody, an affibody, a fibronectin artificial antibody scaffold, an anticalin, an affilin, a DARPin, a VNAR, an iBody, an affimer, a fynomer, a domain antibody (DAb), an abdurin/nanoantibody, a centyrin, an alphabody or a nanofitin which is capable of binding the agent and the other of the first or second protein interaction domain may be a peptide mimic of the agent.

Suitably, one of the first protein interaction domain or second protein interaction domain may be a peptide which mimics minocycline and the other of the first protein interaction domain or second protein interaction domain may be a VHH which binds minocycline and the agent may be selected from minocycline, tetracycline, doxycycline, or an analogue thereof.

The agent may be a small molecule.

The intracellular retention domain may be a Golgi retention domain. Suitably, the retention domain may be selected from the group comprising: a SEKDEL (SEQ ID NO: 28) sequence, a KDEL (SEQ ID NO: 29) sequence, a KKXX (SEQ ID NO: 30) motif, a KXKXX (SEQ ID NO: 31) motif, a tail of adenoviral E19 protein comprising the sequence KYKSRRSFIDEKKMP (SEQ ID NO:32), or a fragment of HLA invariant chain comprising the sequence MHRRRSRSCR (SEQ ID NO:33) or variants thereof.

The intracellular retention domain may be an endoplasmic reticulum retention domain. Suitably, the endoplasmic reticulum retention domain may be selected from Ribophorin I, Ribophorin II, SEC61 or cytochrome b5 or variants thereof.

The intracellular retention domain may be a plasma membrane retention domain. Suitably, the plasma membrane retention domain may be selected from Thy-1 and PRNP or a variant thereof.

The intracellular retention domain may be located at the C-terminus or at the N-terminus of the retention protein.

The POI may be an immune system modulator.

The POI may be a cytokine or chemokine. Suitably, the cytokine or chemokine may be regulated by a Nuclear factor of activated T-cells (NFAT) response element.

Suitably, the POI maybe selected from: IL12, flexiIL12, GM-CSF, IL7, IL15, IL21 and CCL19.

The POI may be an antibody, antibody fragment or dAb.

The POI may be a toxin. Suitably, the toxin may be diphtheria toxin or pseudomonal toxin.

The POI may be a secreted protein. The POI may be a membrane protein (e.g. a cell surface membrane protein or plasma membrane protein).

The releasable protein may encode two or more POIs.

The engineered cytolytic immune cell may be an alpha-beta T cell, a NK cell, a gamma-delta T cell, or a cytokine induced killer cell.

The engineered cytolytic immune cell may further comprise a chimeric antigen receptor (CAR) or transgenic T cell receptor (TCR).

In one aspect, the present invention provides a kit of nucleic acid sequences comprising:
  (i) a first nucleic acid sequence encoding a releasable protein as defined herein;
  (ii) a second nucleic acid sequence encoding a retention protein as defined herein; and
  (iii) a third nucleic acid sequence which encodes a CAR or transgenic TCR.

In another aspect, the present invention provides a nucleic acid construct which comprises:
  (i) a first nucleic acid sequence encoding a releasable protein as defined herein;
  (ii) a second nucleic acid sequence encoding a retention protein as defined herein; and (iii) a third nucleic acid sequence which encodes a CAR or transgenic TCR.

In one aspect, the present invention provides a vector which comprises a nucleic acid construct according to the present invention.

In one aspect, the present invention provides a kit of vectors comprising:
i) a first vector which comprises a first nucleic acid sequence encoding a releasable protein as defined herein;
(ii) a second vector which comprises a second nucleic acid sequence encoding a retention protein as defined herein; and
(iii) a third vector which comprises a third nucleic acid sequence which encodes a CAR or transgenic TCR.

In another aspect, the present invention provides a method for making an engineered cytolytic immune cell according to the present invention, which comprises the step of introducing to a cytolytic immune cell a nucleic acid construct according to the present invention, a first, second and third nucleic acid sequence as defined herein; a vector according to the present invention or a first, second and third vector as defined herein.

In one aspect, the present invention provides a method for controlling the secretion of a POI from a cell, which comprises the steps of: introducing to a cell a nucleic acid construct according to the present invention, a first, second and third nucleic acid sequence as defined herein; a vector according to the present invention or a first, second and third vector as defined herein and administering the agent as defined herein to the cell.

In another aspect, the present invention provides a method for controlling the secretion of a POI from a cell, which comprises administering the agent as defined herein to the engineered cytolytic immune cell according to the present invention or to a cell obtainable by the method of the present invention.

The cell may be from a sample isolated from a subject.

In a further aspect, the present invention provides a pharmaceutical composition which comprises a cytolytic immune cell according to the present invention, a nucleic acid construct according to the present invention, a first, second and third nucleic acid sequence as defined herein, a vector according to the present invention, a first, second and third vector as defined herein.

In one aspect, the present invention provides a pharmaceutical composition which comprises a cell according to the present invention or a cell obtainable by a method according to the present invention.

In a further aspect, the present invention provides a pharmaceutical composition according to the present invention for use in treating and/or preventing a disease.

The present invention further relates to a method for treating and/or preventing a disease, which comprises the step of administering a pharmaceutical composition according to the present invention to a subject in need thereof.

In one aspect, the present invention provides a method for treating and/or preventing a disease, which comprises the step of administering the agent as defined herein to a subject to which the engineered cytolytic immune cell according to the present invention has been administered.

The method may comprise the following steps:
(i) isolation of a cell containing sample;
(ii) introduction of the nucleic acid construct according to the present invention, a first, second and third nucleic acid sequence as defined herein, a vector according to the present invention or a first, second and third vector as defined herein to the cell; and
(iii) administering the cells from (ii) to a subject.

The nucleic acid construct or vector may be introduced by transduction or transfection.

The cell may be autologous. The cell may be allogenic.

The method may comprise monitoring toxic activity and/or anti-tumour activity in the subject and optionally further comprises the step of: stopping or reducing the administration of an agent as defined herein to the subject in order to reduce adverse toxic effects; or increasing the administration of an agent as defined herein to the subject in order to increase anti-tumour effects.

In another aspect, the present invention relates to the use of a pharmaceutical composition according to the present invention in the manufacture of a medicament for the treatment and/or prevention of a disease.

The disease may be cancer. The cancer may be neuroblastoma. The cancer may be prostate cancer.

The invention further relates to the use of an agent as defined herein, to increase secretion of a POI from an engineered cytolytic immune cell according to the present invention.

DETAILED DESCRIPTION OF THE INVENTION

Protein Interaction Domains

Figure 1:
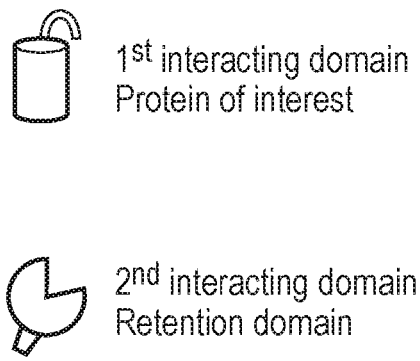
FIG. 1—Schematic diagram illustrating an embodiment of the present invention wherein a releasable protein comprises a first protein interacting domain and a protein of interest and a retention protein comprises a second interacting domain and a retention domain. The first protein interaction domain and the second protein interaction domain are capable of a conditional interaction.

The first protein interaction domain, second protein interaction domain and agent of the present invention may be any combination of molecules/peptides/domains which enable the conditional interaction of the protein interaction domains according to the presence or absence of the agent.

The first and second protein interaction domains may be capable of specifically binding to one another.

The protein-protein interaction between the first and second protein interaction domains may spontaneously occur, but be disrupted in the presence of an agent i.e. a separate molecule acting as a "disruptor" of binding.

The interaction between the first protein interaction domain and second protein interaction may be disrupted by the presence of an agent, such that in the absence of the agent, the first protein interaction domain and second protein interaction bind and result in retention of the POI within an intracellular compartment; whereas in the presence of the agent, the first protein interaction domain and second protein interaction do not bind and the POI is not retained within the intracellular compartment.

As used herein, "disrupted" means that the binding between the first and second protein interaction domains is reduced or eliminated completely by addition of the agent. Suitably, binding between the first and second protein interaction domains may be reduced by at least 10%, at least 20%, at least 30%, at least 40%, at least 50%, at least 60%, at least 70%, at least 80%, at least 90%, at least 95% or at least 99% by addition of the agent.

The interaction between the first protein interaction domain and the second protein interaction domain may be disrupted by the agent binding competitively to one of the first protein interaction domain or the second protein interaction domain.

As used herein "competitive binding of the agent" refers to the binding of an agent which prevents binding between the first and second protein interaction domains. An agent may bind competitively by directly binding to binding site of a protein domain which interacts with the reciprocal binding site on the other protein domain. Alternatively, the agent may bind competitively by binding to a region which overlaps with the binding site of a protein domain which interacts with the reciprocal binding site on the other protein domain.

The agent may be capable of specifically binding to the first protein interaction domain or the second protein interaction domain at a higher affinity than the binding between the first protein interaction domain and the second protein interaction domain.

As used herein, "higher affinity" means that the agent binds to one of first or second protein interaction domains at least 5, 10, 20, 50, 100, 1000 or 10000-fold greater affinity than the binding affinity between the first protein interaction domain and the second protein interaction domain.

Assays for measuring binding affinity and competitive binding are known in the art such as radioactive ligand binding assays (including saturation binding, scatchard plot), non-radioactive ligand binding assays (including fluorescence polarization, fluorescence resonance energy transfer and surface plasmon resonance/Biacore, and solid phase ligand binding assays.

For example, the binding system may be based on any peptide:peptide protein interaction domain system.

The first or second protein interaction domain may be a peptide mimic of the agent.

Suitably, either of the first or second protein interaction domain may comprise a peptide binding domain which binds the peptide and the other protein interaction domain may comprise a peptide mimic which binds the peptide binding domain with lower affinity than the peptide. In these embodiments, the use of peptide as an agent may disrupt the binding of the peptide mimic to the peptide binding domain through competitive binding. The peptide mimic may have a similar amino acid sequence to the "wild-type" peptide, but with one of more amino acid changes to reduce binding affinity for the peptide binding domain.

The agent may bind the first protein interaction domain or the second protein interaction domain with at least 5, 10, 20, 50, 100, 1000 or 10000-fold greater affinity than the affinity between the first protein interaction domain and the second protein interaction domain.

Small molecules agents which disrupt protein-protein interactions have long been developed for pharmaceutical purpose (reviewed by Vassilev et al; Small-Molecule Inhibitors of Protein-Protein Interactions ISBN: 978-3-642-17082-9, incorporated herein by reference). The proteins or peptides whose interaction is disrupted (or relevant fragments of these proteins) can be used as the first and/or second protein interaction domain and the small molecule may be used as the agent.

A list of proteins/peptides whose interaction is disruptable using an agent such as a small molecule is given in the table below. These disputable protein-protein interactions (PPI) may be used in the present invention. Further information on these PPIs is available from White et al 2008 (Expert Rev. Mol. Med. 10:e8 which is incorporated herein by reference).

| Interacting Protein 1 | Interacting Protein 2 | Inhibitor of PPI |
| --- | --- | --- |
| p53 | MDM2 | Nutlin |
| Anti-apoptotic Bcl2 member | Apoptotic Bcl2 member | GX015 and ABT-737 |
| Caspase-3, -7 or -9 | X-linked inhibitor of apoptosis protein (XIAP) | DIABLO and DIABLO mimetics |
| RAS | RAF | Furano-indene derivative |
| FR2-7 | PD2 domain of DVL | FJ9 |
| T-cell factor (TCF) | Cyclic AMP response element binding protein (CBP) | ICG-001 |
| Avadin/streptavidin | Biotin | Biotin mimic |

In addition to the exemplified PPI systems described above, it will be understood that other PPI systems may be generated using phage display of peptide sequences to generate peptides which mimic the interaction of a small molecule which binds to a protein.

In other embodiments, antibodies may be generated which bind small molecules for use as protein interaction domains according to the present invention. Suitable methods for generating antibodies are well-known in the art.

The releasable and retention proteins as described herein may comprise linkers. Linkers (or spacers) are short sequences which separate multiple domains in a protein. A linker may comprise flexible residues such as glycine and serine repeats which allow the adjacent protein domains to move relative to one another. Suitably, the releasable and/or retention protein may comprise one or more serine-glycine linker domains. The linker may be of any length with provides sufficient flexibility. Suitably, the linker may be 2, 3, 4, 5, 10, 15, 20, 25, 30 or more residues long.

The Tet Repressor (TetR) System

Small molecule systems for controlling the co-localization of polypeptides are known in the art, for example the Tet repressor (TetR), TetR interacting protein (TiP), tetracycline system.

The Tet operon is a well-known biological operon which has been adapted for use in mammalian cells. The TetR binds tetracycline as a homodimer and undergoes a conformational change which then modulates the DNA binding of the TetR molecules. Klotzsche et al. (Nucleic Acids Res. 2009 April; 37(6):1778-88, incorporated herein by reference), described a phage-display derived peptide which activates the TetR. This protein (TetR interacting protein/TiP) has a binding site in TetR which overlaps, but is not identical to, the tetracycline binding site. Thus TiP and tetracycline compete for binding of TetR.

In the cell of the present invention, one of the first or second protein interaction domains may comprise (or consist of) TetR or TiP, and the other of the first or second protein interaction domain may be the corresponding, complementary binding partner or variants thereof.

The amino acid sequences of TetR and TIP are shown below:

An amino acid sequence of TetR is set forth in SEQ ID NO: 1.

(SEQ ID NO: 1)
MSRLDKSKVINSALELLNEVGIEGLTTRKLAQKLGVEQPTLYWHVKNKR

ALLDALAIEMLDRHHTHFCPLEGESWQDFLRNNAKSFRCALLSHRDGAK

VHLGTRPTEKQYETLENQLAFLCQQGFSLENALYALSAVGHFTLGCVLE

DQEHQVAKEERETPTTDSMPPLLRQAIELFDHQGAEPAFLFGLELIICG

LEKQLKCESGS

An amino acid sequence of TiP is set forth in SEQ ID NO: 2—MWTWNAYAFAAP (SEQ ID NO: 2).

In some embodiments, a linker (such as a serine-glycine linker) may be used to separate TiP from another protein. The linker may allow TIP the flexibility to orient itself correctly and/or to separate TiP from the protein it is connected to.

For example, the amino acid sequence set forth in SEQ ID NO: 3 comprises the amino acid sequence of TiP and a serine-glycine linker ((SGGGS)—MWTWNAYAFAAPSGGGS (SEQ ID NO: 3).

Where the first and second protein interaction domains are TetR or TiP, the agent may be tetracycline, doxycycline, minocycline or an analogue thereof. An analogue refers to a variant of tetracycline, doxycycline or minocycline which retains the ability to specifically bind to TetR or has increased or higher affinity binding to TetR compared to tetracycline, doxycycline or minocycline.

Variant sequences of TetR and/or TiP may have at least 80%, 85%, 90%, 95%, 98% or 99% sequence identity to SEQ ID NO: 1-3, provided that the sequences provide an effective binding system which is disrupted in the presence of tetracycline, doxycycline, minocycline or an analogue thereof. That is, provided that the sequences facilitate co-localisation of a protein interaction domains of the present invention which may be disrupted in the presence of tetracycline, doxycycline, minocycline or an analogue thereof.

The percentage identity between two polypeptide sequences may be readily determined by programs such as BLAST, which is freely available at blast.ncbi.nlm.nih.gov. Suitably, the percentage identity is determined across the entirety of the reference and/or the query sequence.

In one embodiment, one of the first or second protein interaction domains may comprise (or consist of) TetR or TiP or a variant thereof, and the other of the first or second protein interaction domain may be the corresponding, complementary binding partner or variants thereof, the agent may be tetracycline, doxycycline, minocycline or an analogue thereof and the protein of interest may be any POI as described herein.

In one embodiment, one of the first or second protein interaction domains may comprise (or consist of) TetR or TiP or a variant thereof, and the other of the first or second protein interaction domain may be the corresponding, complementary binding partner or variants thereof, the protein of interest may be flexi IL-12.

In one embodiment, a first nucleic acid sequence may encode a releasable protein which comprises flexiIL-12, a TiP protein interaction domain and a signal peptide. Suitably, the nucleic acid sequences encoding flexiIL-12, TiP (or a variant thereof) and the signal peptide are operably linked. Suitably, the signal peptide may be a murine Ig kappa chain V-III region signal peptide sequence. In this embodiment, the second nucleic acid sequence may encode a retention protein, which comprises TetR (or a variant thereof), an intracellular retention domain and a signal peptide. Suitably, the nucleic acid sequences encoding TetR, the intracellular retention domain and the signal peptide are operably linked. Suitably, intracellular retention domain may be SEKDEL (SEQ ID NO: 28).

In one embodiment, the releasable protein may comprise the sequence set forth in SEQ ID NO: 5 or a variant thereof.

(SEQ ID NO: 5)
METDTLLLWVLLLWVPGSTMWTWNAYAFAAPSGGGSIWELKKDVYWE

LDWYPDAPGEMWLTCDTPEEDGITWTLDQSSEVLGSGKTLTIQVKEFGD

AGQYTCHKGGEVLSHSLLLLHKKEDGIWSTDILKDQKEPKNKTFLRCEA

KNYSGRFTCWWLTTISTDLTFSVKSSRGSSDPQGVTCGAATLSAERVRG

DNKEYEYSVECQEDSACPAAEESLPIEVMVDAVHKLKYENYTSSFFIRD

IIKPDPPKNLQLKPLKNSRQVEVSWEYPDTWSTPHSYFSLTFCVQVQGK

SKREKKDRVFTDKTSATVICRKNASISVRAQDRYYSSSWSEWASVPCSG

GGGSGGGGSGGGGSRNDPDATPDPGMFPCLHHSQNLLRAVSNMLQKARQ

TLEFYPCTSEEIDHEDITKDKTSTVEACLPLELTKNESCLNSRETSFIT

NGSCLASRKTSFMMALCLSSIYEDSKMYQVEFKTMNAKLLMDPKRQIFL

DQNMLAVIDELMQALNFNSETVPQKSSLEEPDFYKTKIKLCILLHAFRI

RAVTIDRVMSYLNAS.

SEQ ID NO: 5 comprises in order, a murine Ig kappa chain V-III region signal peptide sequence (which is shown as underlined), a TIP sequence (which is shown in bold italics), a human IL-12 beta subunit (which is shown in normal text) a serine glycine linker (which is shown in bold) and a human IL-12 alpha subunit (which is shown in italics).

In one embodiment, the releasable protein may comprise the sequence set forth in SEQ ID NO: 6 or a variant thereof.

(SEQ ID NO: 6)
METDTLLLKVLLLWVPGSTG*MWTWNAYAFAAPSGGGS*IWELKKDVYVV

ELDWYPDAPGEMVVLTCDTPEEDGITWTLDQSSEVLGSGKTLTIQVKEF

GDAGQYTCHKGGEVLSHSLLLLHKKEDGIWSTDILKDQKEPKNKTFLRC

EAKNYSGRFTCWWLTTISTDLTFSVKSSRGSSDPQGVTCGAATLSAERV

RGDNKEYEYSVECQEDSACPAAEESLPIEVMVDAVHKLKYENYTSSFFI

RDIIKPDPPKNLQLKPLKNSRQVEVSWEYPDTWSTPHSYFSLTFCVQVQ

GKSKREKKDRVFTDKTSATVICRKNASISVRAQDRYYSSSWSEWASVPC

SGGGGSGGGGSGGGGS*RNDPDATPDPGMFPCLHHSQNLLRAVSNMLQKA*

*RQTLEFYPCTSEEIDHEDITKDKTSTVEACLPLELTKNESCLNSRETSF*

*ITNGSCLASRKTSFMMALCLSSIYEDSKMYQVEFKTMNAKLLMDPKRQI*

*FLDQNMLAVIDELMQALNFNSETVPQKSSLEEPDFYKTKIKLCILLHAF*

*RIRAVTIDRVMSYLNAS*.

SEQ ID NO: 6 comprises in order, a murine Ig kappa chain V-III region signal peptide sequence with a lysine mutation at amino acid position nine (which is shown underlined), a TIP sequence (which is shown in bold italics), a human IL-12 beta subunit (which is shown in normal text), a serine glycine linker (which is shown in bold) and a human IL-12 alpha subunit (which is shown in italics).

The lysine substitution at amino acid position nine reduces the efficiency of the signal peptide thereby reducing the amount of TiP-IL-12 which enters the ER and which can be secreted from the cell.

In one embodiment, the retention protein may comprise the sequence set forth in SEQ ID NO: 7 or a variant thereof.

(SEQ ID NO: 7)
MGWSCIILFLVATATGVHSMSRLDKSKVINSALELLNEVGIEGLTTRKLAQ

KLGVEQPTLYWHVKNKRALLDALAIEMLDRHHTHFCPLEGESWQDFLRNNA

KSFRCALLSHRDGAKVHLGTRPTEKQYETLENQLAFLCQQGFSLENALYAL

SAVGHFTLGCVLEDQEHQVAKEERETPTTDSMPPLLRQAIELFDHQGAEPA

FLFGLELIICGLEKQLKCESGSSGGGG*SEKDEL*.

SEQ ID NO: 7 comprises, in order, a murine Ig heavy chain V region 102 signal peptide sequence (which is shown underlined) a TetR sequence (which is shown in normal text), a serine-glycine linker (which is shown in bold) and a SEKDEL (SEQ ID NO: 28) ER retention domain (which is shown in italics).

Variant sequences of SEQ ID NO: 5-7 may have at least 80%, 85%, 90%, 95%, 98% or 99% sequence identity to SEQ ID NO: 5-7, provided that the sequences provide an effective binding system which is disrupted in the presence of tetracycline, doxycycline, minocycline or an analogue thereof. That is, provided that the sequences facilitate co-localisation of a protein interaction domains of the present invention which may be disrupted in the presence of tetracycline, doxycycline, minocycline or an analogue thereof.

In another embodiment, one of the first or second protein interaction domains may comprise an antibody, such as a domain antibody, which binds an agent such as a small molecule.

In one embodiment, one of the first or second protein interaction domains comprises an antibody, a single domain antibody (sdAb), a VHH/nanobody, a nanobody, an affibody, a fibronectin artificial antibody scaffold, an anticalin, an affilin, a DARPin, a VNAR, an iBody, an affimer, a fynomer, a domain antibody (DAb), an abdurin/nanoantibody, a centyrin, an alphabody or a nanofitin which is capable of binding the agent and the other of the first or second protein interaction domains is a peptide mimic of the agent.

In one embodiment, one of the first or second protein interaction domains is a peptide which mimics minocycline and the other of the first or second protein interaction domains is an antibody which binds minocycline and the agent is selected from minocycline, tetracycline, doxocycline or an analogue thereof.

A minocycline peptide mimic may comprising an amino acid sequence set forth in SEQ ID NO: 41: ACPXWAXXFC (SEQ ID NO: 41) wherein X is any amino acid.

The first or second protein interaction domain which mimics minocycline may be a peptide selected from the following group:
ACPGWARAFC (SEQ ID NO: 34); ACPHWAQAFC (SEQ ID NO: 35); ACPQWAMMFC (SEQ ID NO: 36) and ACPPWAYSFC (SEQ ID NO: 37).

Suitably, the first or second protein interaction domain which mimics minocycline may comprise (or consist of) an amino acid sequence set forth in SEQ ID NO: 34. Suitably, the first or second protein interaction domain which mimics minocycline may comprise (or consist of) an amino acid sequence set forth in SEQ ID NO: 35. Suitably, the first or second protein interaction domain which mimics minocycline may comprise (or consist of) an amino acid sequence set forth in SEQ ID NO: 36. Suitably, the first or second protein interaction domain which mimics minocycline may comprise (or consist of) an amino acid sequence set forth in SEQ ID NO: 37.

The antibody such as domain antibody which binds minocycline may have an amino acid sequence as set forth in SEQ ID NO: 8 or a variant thereof.

(SEQ ID NO: 8)
MKYLLPTAAAGLLLLAAQPAMAQVQLQESGGGLVQPGSSLRLSCAASGRTF

SSYNIGWFRQAPGKEREFVAAISWSGARTYYADSVKGRFTISRDNAKNTVY

LQMNSLKPEDTAVYSCAAGRGWGTEAILDYWGQGTQVTVSSAAAHHHHHHG

AAEQKLISEEDLNGAA.

The antibody such as domain antibody which binds minocycline (or a variant thereof) may have an amino acid sequence as set forth in SEQ ID NO: 9 or a variant thereof.

(SEQ ID NO: 9)
MKYLLPTAAAGLLLLAAQPAMAQVQLQESGGGLVQAGDSLRLSCSASGRSL

SSYVMGWFRQAPGKEREFVAAISWSGARTYYADSVKGRFTISRDNAKNTVY

LQMNSLKPEDTAVYRCAAGRGWGTEAILDYWGQGTQVTVSSAAAHHHHHHG

AAEQKLISEEDLNGAA.

The antibody such as domain antibody which binds minocycline (or a variant thereof) may have an amino acid sequence as set forth in SEQ ID NO: 10 or a variant thereof.

(SEQ ID NO: 10)
MKYLLPTAAAGLLLLAAQPAMAQVQLQESGGGLVQAGGSLRLACVASGNIG

LVSVMDWYRQVPGKERELVATITGGGRTNYADSVKGRFTISMDYAKATVYL

QMNNLQPEDTAVYYCRLVSSGRAFWGQGTQVTVSSAAAHHHHHHGAAEQKL

ISEEDLNGAA.

The antibody such as domain antibody which binds minocycline (or a variant thereof) may have an amino acid sequence as set forth in SEQ ID NO: 11 or a variant thereof.

(SEQ ID NO: 11)
MKYLLPTAAAGLLLLAAQPAMAQVQLQESGGGLVQAGGSLRLSCAASGRTF

SSYNIGWFRQAPGKEREFVAAISWSGARTYYADSVKGRFTISRDNAKNTVY

LQMNSLKPEDTAVYYCVAGRGWGTEAILDYWGQGTQVTVSSAAAHHHHHHG

AAEQKLISEEDLNGAA.

The antibody such as domain antibody which binds minocycline (or a variant thereof) may have an amino acid sequence as set forth in SEQ ID NO: 12 or a variant thereof.

(SEQ ID NO: 12)
MKYLLPTAAAGLLLLAAQPAMAQVQLQESGGGLVQAGGSLRLSCAASGRTF

SRYNIGWFRQAPGKEREFVAAISWSGARTYYADSVKGRFTISRDNAKNTVY

LQMNSLKPEDTAVYYCAAGRGWGTEAILDYWGQGTQVTVSSAAAHHHHHHG

AAEQKLISEEDLNGAA.

The antibody such as domain antibody which binds minocycline (or a variant thereof) may have an amino acid sequence as set forth in SEQ ID NO: 13 or a variant thereof.

(SEQ ID NO: 13)
MKYLLPTAAAGLLLLAAQPAMAQVQLQESGGGLVQAGGSLRLACVASGNIG

LVSVMDWYRQVPGKERELVATITGGGSTNYSDSVKGRFTISMDYAKSTIYL

QMNSLKPEDTAVYYCRLVNNGRPFWGQGTQVTVSSAAAHHHHHHGAAEQKL

ISEEDLNGAA.

Variant sequences of SEQ ID NO: 8-13 may have at least 80%, 85%, 90%, 95%, 98% or 99% sequence identity to SEQ ID NO: 8-13, provided that the sequence is able to bind minocycline or an analogue thereof.

The present intention provides an engineered cytolytic immune cell which secretes a POI, wherein secretion of said POI is "tunable". As used herein, "tunable" means that it is possible to increase, decrease or turn off secretion of the POI by the engineered cytolytic immune cell.

Secretion may be tuned in a number of ways. For example, the ratio of the releasable and the retention protein may be modified to increase or decrease secretion. The ratio of the POI and the intracellular retention domain may be modified to increase or decrease secretion. Suitably to increase secretion, a higher ration of POI to intracellular retention domain could be used, or vice versa.

The ratio of proteins may be modified by modulating the efficiency of one or more of the signal peptides on the two proteins. Methods for modulating the efficiency of signal peptides are described in WO2016/174409, which is incorporated herein by reference).

In another embodiment, secretion may be tuned by modifying the affinity of the protein interaction domain for the agent. Alternatively, secretion may be tuned by using an agent which has higher or lower affinity for the protein interaction domain.

Releasable Protein

As used herein "releasable protein" refers to a protein which is capable of detaching from the retention protein. The releasable protein is capable of translocating from one compartment to another, for example a releasable protein may be capable of being secreted from a cell or of translocating to the plasma membrane.

Suitably, a releasable protein may comprise a signal peptide which directs the protein to the secretory pathway. Suitably, a releasable protein may be a membrane protein for example which comprises an anchor or transmembrane domain.

Protein of Interest (POI)

As used herein, "protein of interest" "POI" refers to the protein which the cytolytic immune cell has been engineered to express and secrete.

The POI may be any protein for which it is desirable to control the secretion of, for example, for which it is desirable to control the secretion of in the tumour microenvironment. Suitably the POI is an immune system modulator. Suitably, the POI may be capable of modulating the tumour microenvironment.

As used herein "immune system modulator" means that the POI is capable of influencing the immune system.

The POI may modulate the immune system by increasing the immune response.

As used herein "capable of modulating the tumour microenvironment" means that the POI is able to influence or alter the tumour microenvironment.

The POI may modify the tumour microenvironment to inhibit tumour growth or tumour survival.

Suitably, the POI may be a cytokine, a chemokine, an antibody or fragment thereof (such as an scFv or Fab fragment) or a toxin.

Suitably, the POI may be immunomodulatory. The POI may block inhibitory signals (for example programmed cell death protein 1 (PD1). The POI may be a PD1 blocking antibody. The POI may activate the immune system (for example tumour necrosis factor receptor superfamily, member 4 (TNFRSF4 or OX040) agonistic agents, 41BB agonistic agents or inducible co-stimulator molecule (ICOS) agonistic agents). The POI may be an OX040 agonist. The POI may be a 41BB agonist. The POI may be an ICOS agonist.

The sequence of a PD1 blocking antibody (clone 5C4) is set forth in SEQ ID NO: 14. Suitably, the POI may comprise the sequence set forth in SEQ ID NO: 14 or a variant thereof.

(SEQ ID NO: 14)
MALPVTALLLPLALLLHAARPEIVLTQSPATLSLSPGERATLSCRASQSVS

SYLAWYQQKPGQAPRLLIYDASNRATGIPARFSGSGSGTDFTLTIEDFAVY

YCQQSTFGQGTKVEIKGGGGSGGGGSGGGGSQVYLVESGGGVVQPGRSLRL

SCAASGFTFSNYGMHWVRQAPGKGLEWVALIWYDGSNKYYADSVKGRFTIS

RDNSKNTLYLQMTSLRVEDTAVYYCASNVDHWGQGTLVTVSS.

The sequence of an OX40 agonist (a trimeric coiled coil OX40L) is set forth in SEQ ID NO: 15. Suitably, the POI may comprise the sequence set forth in SEQ ID NO: 15 or a variant thereof.

(SEQ ID NO: 15)
ACGCAAAPDVKDLLSRLEELEGLVSSLREQQVSHRYPRIQSIKVQFTEY

KKEKGFILTSQKEDEIMKVQNNSVIINCDGFYLISLKGYFSQEVNISLH

YQKDEEPLFQLKKVRSVNSLMVASLTYKDKVYLNVTTDNTSLDDFHVNG

GELILIHQNPGEFCVL.

The coiled coil sequence is shown in bold.

The sequence of a 41BB agonist (a trimeric coiled coil 41 BBL) is set forth in SEQ ID NO: 16. Suitably, the POI may comprise the sequence set forth in SEQ ID NO: 16 or a variant thereof.

(SEQ ID NO: 16)
ACGCAAAPDVKDLLSRLEELEGLVSSLREQACPWAVSGARASPGSAASP

RLREGPELSPDDPAGLLDLRQGMFAQLVAQNVLLIDGPLSWYSDPGLAG

VSLTGGLSYKEDTKELVVAKAGVYYVFFQLELRRVVAGEGSGSVSLALH

LQPLRSAAGAAALALTVDLPPASSEARNSAFGFQGRLLHLSAGQRLGVH

LHTEARARHAWQLTQGATVLGLFRVTPEIPAGLPSPRSE.

The coiled coil sequence is shown in bold.

The POI may be a cytokine. The POI may be a chemokine.

The POI may be selected from interleukin-12 (IL-12), flexiIL-12, interleukin-7 (IL-7), interleukin-15 (interleukin-15), interleukin-21, granulocyte-macrophage colony-stimulating factor (GM-CSF), and chemokine (C-C motif) ligand 19 (CCL19).

Suitably, the POI may be IL-12.

Suitably, the POI may be IL-12. Suitably, the POI may comprise an IL-12 alpha subunit and an IL-12 beta subunit. Suitably, the IL-12 alpha subunit and/or IL-12 beta subunit may comprise an amino acid sequence as set forth in UniProt accessions P29459 and/or P29460 respectively The amino acid sequence of IL-12 alpha subunit from UniProt accession P29459 is set forth in SEQ ID NO: 17. Suitably, the POI may comprise the sequence set forth in SEQ ID NO: 17 or a variant thereof.

(SEQ ID NO: 17)
MCPARSLLLVATLVLLDHLSLARNLPVATPDPGMFPCLHHSQNLLRAVSN

MLQKARQTLEEYPCTSEEIDHEDITKDKTSTVEACLPLELTKNESCLNSR

ETSFITNGSCLASRKTSFMMALCLSSIYEDLKMYQVEFKTMNAKLLMDPK

RQIFLDQNMLAVIDELMQALNFNSETVPQKSSLEEPDFYKTKIKLCILLH

AFRIRAVTIDRVMSYLNAS.

The amino acid sequence of IL-12 beta subunit from UniProt accession P29460 is set forth in SEQ ID NO: 18. Suitably, the POI may comprise the sequence set forth in SEQ ID NO: 18 or a variant thereof.

(SEQ ID NO: 18)
MCHQQLVISWFSLVFLASPLVAIWELKKDVYVVELDWYPDAPGEMVVLTC

DTPEEDGITWTLDQSSEVLGSGKTLTIQVKEFGDAGQYTCHKGGEVLSHS

LLLLHKKEDGIWSTDILKDQKEPKNKTFLRCEAKNYSGRFTCWWLTTIST

DLTFSVKSSRGSSDPQGVTCGAATLSAERVRGDNKEYEYSVECQEDSACP

AAEESLPIEVMVDAVHKLKYENYTSSFFIRDIIKPDPPKNLQLKPLKNSR

QVEVSWEYPDTWSTPHSYFSLTFCVQVQGKSKREKKDRVFTDKTSATVIC

RKNASISVRAQDRYYSSSWSEWASVPCS.

Suitably, the POI may be flexi IL-12. Flexi IL-12 comprises the human IL-12 p35 and p40 subunits connected by a flexible linker, such as a linker comprising a serine-glycine repeat.

The amino acid sequence of flexi IL-12 is set forth in SEQ ID NO: 19. Suitably, the POI may comprise the sequence set forth in SEQ ID NO: 19 or a variant thereof.

(SEQ ID NO: 19)
IWELKKDVYVVELDWYPDAPGEMVVLTCDTPEEDGITWTLDQSSEVLGSG

KTLTIQVKEFGDAGQYTCHKGGEVLSHSLLLLHKKEDGIWSTDILKDQKE

PKNKTFLRCEAKNYSGRFTCWWLTTISTDLTFSVKSSRGSSDPQGVTCGA

ATLSAERVRGDNKEYEYSVECQEDSACPAAEESLPIEVMVDAVHKLKYEN

YTSSFEIRDIIKPDPPKNLQLKPLKNSRQVEVSWEYPDTWSTPHSYFSLT

FCVQVQGKSKREKKDRVFTDKTSATVICRKNASISVRAQDRYYSSSWSEW

ASVPCSGGGGSGGGGSGGGGS*RNEPEATPDPGMFPCEHHSQNEERAVSNM*

*EQKARQTIEFYPCTSEEIDHEDITKDKTSTVEACLPLELTKNESCLNSRE*

*TSEITNGSCLASRKTSFMMALCESSIYEDSKMYQVEFKTMNAKLLMDPKR*

*QIFLDQNMLAVIDELMQALNFNSETVPQKSSLEEPDFYKTKIKLCILLHA*

*FRIRAVTIDRVMSYLNAS*.

The human IL-12 beta subunit is shown in normal text, the serine glycine linker is shown in bold and the human IL-12 alpha subunit is shown in italics.

The amino acid sequence of IL-7 is set forth in SEQ ID NO: 20. Suitably, the POI may comprise the sequence set forth in SEQ ID NO: 20 or a variant thereof.

(SEQ ID NO: 20)
MFHVSFRYIFGLPPLILVLLPVASSDCDIEGKDGKQYESVLMVSIDQLLD

SMKEIGSNCLNNEFNFFKRHICDANKEGMFLFRAARKLRQFLKMNSTGDF

DLHLLKVSEGTTILLNCTGQVKGRKPAALGEAQPTKSLEENKSLKEQKKL

NDLCFLKRLLQEIKTCWNKILMGTKEH.

The amino acid sequence of IL-15 is set forth in SEQ ID NO: 21. Suitably, the POI may comprise the sequence set forth in SEQ ID NO: 21 or a variant thereof.

(SEQ ID NO: 21)
MRISKPHLRSISIQCYLCLLLNSHFLTEAGIHVFILGCFSAGLPKTEANW

VNVISDLKKIEDLIQSMHIDATLYTESDVHPSCKVTAMKCFLLELQVISL

-continued

ESGDASIHDTVENLIILANNSLSSNGNVTESGCKECEELEEKNIKEFLQS

FVHIVQMFINTS.

The amino acid sequence of IL-21 is set forth in SEQ ID NO: 22. Suitably, the POI may comprise the sequence set forth in SEQ ID NO: 22 or a variant thereof.

(SEQ ID NO: 22)
MERIVICLMVIFLGTLVHKSSSQGQDRHMIRMRQLIDIVDQLKNYVNDLV

PEFLPAPEDVETNCEWSAFSCFQKAQLKSANTGNNERIINVSIKKLKRKP

PSTNAGRRQKHRLTCPSCDSYEKKPPKEFLERFKSLLQKMIHQHLSSRTH

GSEDS.

The amino acid sequence of CCL19 is set forth in SEQ ID NO: 23. Suitably, the POI may comprise the sequence set forth in SEQ ID NO: 23 or a variant thereof.

(SEQ ID NO: 23)
MALLALSLLVLWTSPAPTLSGTNDAEDCCLSVTQKPIPGYIVRNFHYLLI

KDGCRVPAVVFTTLRGRQLCAPPDQPWVERIIQRLQRTSAKMKRRSS.

The POI may be an antibody. Suitably, the POI may be an antibody, an antibody fragment (e.g. scFv, F(ab)), a single domain antibody (sdAb), a VHH/nanobody, a nanobody, an affibody, a fibronectin artificial antibody scaffold, an anticalin, an affilin, a Designed Ankyrin repeat protein (DARPin), a VNAR, an iBody, an affimer, a fynomer, a domain antibody (DAb), an abdurin/nanoantibody, a centyrin, an alphabody or a nanofitin The POI may be a toxin. Suitably, the toxin may be the diphtheria toxin. Suitably, the toxin may be pseudomonas toxin. Suitably, the toxin may be the shigella toxin.

The amino acid sequence of the diphtheria toxin is set forth in SEQ ID NO: 24. Suitably, the POI may comprise the sequence set forth in SEQ ID NO: 24 or a variant thereof.

(SEQ ID NO: 24.)
MLVRGYVVSRKLFASILIGALLGIGAPPSAHAGADDVVDSSKSEVMENFS

SYHGTKPGYVDSIQKGIQKPKSGTQGNYDDDWKGFYSTDNKYDAAGYSVD

NENPLSGKAGGVVKVTYPGLTKVLALKVDNAETIKKELGLSLTEPLMEQV

GTEEFIKRFGDGASRVVLSLPFAEGSSSVEYINNWEQAKALSVELEINFE

TRGKRGQDAMYEYMAQACAGNRVRRSVGSSLSCINLDWDVIRDKTKTKIE

SLKEHGPIKNKMSESPNKTVSEEKAKQYLEEFHQTALEHPELSELKTVTG

TNPVFAGANYAAWAVNVAQVIDSETADNLEKTTAALSILPGIGSVMGIAD

GAVHHNTEEIVAQSIALSSLMVAQAIPLVGELVDIGFAAYNFVESIINLF

QVVHNSYNRPAYSPGHKTQPFLHDGYAVSWNTVEDSIIRTGFQGESGHDI

KITAENTPLPIAGVLLPTIPGKLDVNKSKTHISVNGRKIRMRCRAIDGDV

TFCRPKSPVYVGNGVHANLHVAFHRSSSEKIHSNEISSDS1GVLGYQKTV

DHTKVNSKLSLEFEIKS

Variant sequences of SEQ ID NO: 14-24 may have at least 80%, 85%, 90%, 95%, 98% or 99% sequence identity to SEQ ID NO: 14-24, provided that the sequence is able to function as a protein of interest. The variant sequence retains at least one function of SEQ ID NO: 14-24, such as the ability to act as an immune system modulator or ability to modulate the tumour environment.

The POI may be regulated by a nuclear factor of activated T cells (NFAT) response element.

An NFAT response element may comprise the amino acid sequence set forth in SEQ ID NO:

(SEQ ID NO: 4)
4: GGAGGAAAAACTGTTTCATACAGAAGGCGT.

The NFAT response element may comprise repeat units such as 3, 4, 5 or 6 repeat units. Suitably, the NFAT response element may comprise 3, 4, 5 or 6 repeat units of SEQ ID NO: 4. The NFAT response element may be positioned in front of a promoter (e.g. a CMV promoter).

The engineered cytolytic immune cell may comprise nucleic acid sequences encoding two or more POIs such as two POIs, three POIs, four POIs or five or more POIs. Suitably, the releasable protein may comprise two or more POIs.

The two or more POIs may be a combination of cytokines, chemokines, antibodies and/or toxins. Suitably, the combination of POIs may be synergistic. Suitably the combination may be a combination of cytokines and chemokines such as IL-7 and CCL19.

The POI may be operably linked to a first protein interaction domain as defined herein. The POI may be operably linked to a both a signal peptide and a first protein interaction domain as defined herein.

Figure 2:
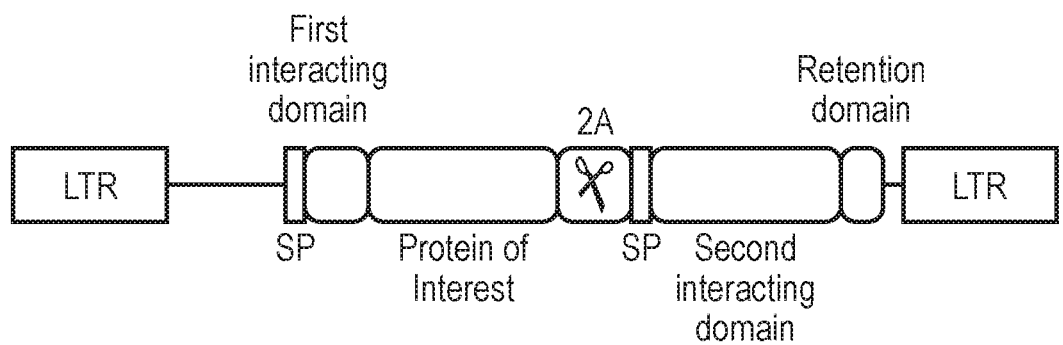
FIG. 2—Schematic diagram illustrating a construct according to the present invention. The construct comprises a nucleic acid sequence encoding a releasable protein which comprises from left to right, a signal peptide, a first protein interaction domain and a protein of interest, and a nucleic acid sequence which encodes a retention protein which comprises from left to right, a signal peptide, a second protein interaction domain and an intracellular retention domain. A nucleic acid sequence encoding a self-cleaving peptide (2A domain) is located between the nucleic acid sequence encoding the releasable protein and the retention protein.
Figure 3A:
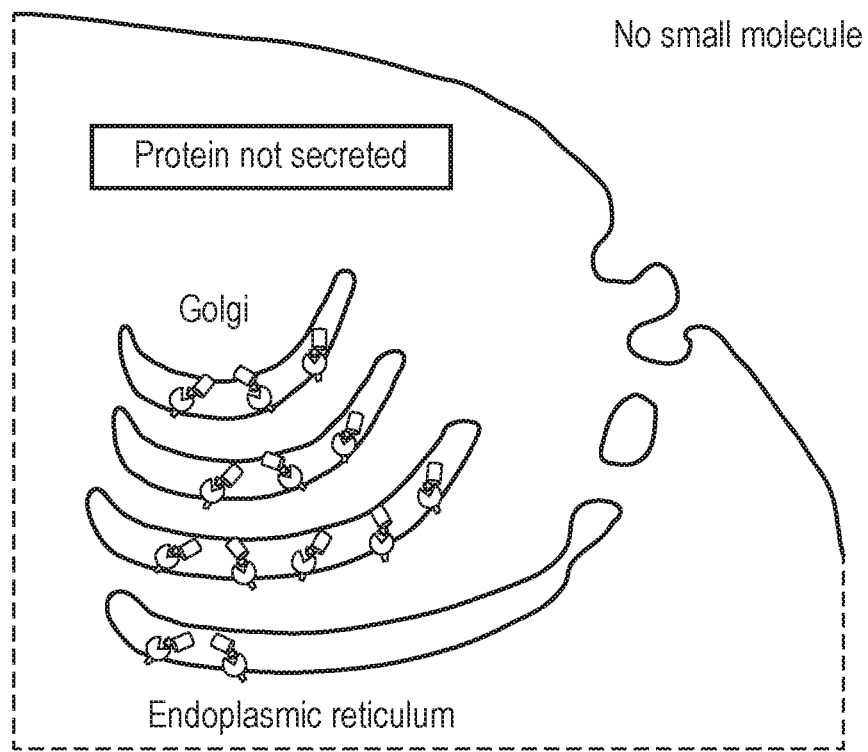
FIGS. 3A and 3B—An illustrative example of an engineered cytolytic immune cell according to the present invention. The first protein interaction domain comprises TetR interacting protein (TiP) and the protein of interest is IL-12. The second protein interaction domains comprises the Tet repressor (TetR) and an endoplasmic reticulum retention domain, KDEL (SEQ ID NO: 29). A) In the absence of agent, the first protein interaction domain and the second protein interaction domain bind and result in retention of IL-12 within the endoplasmic reticulum. B) In the presence of an agent, the protein:protein interaction between TetR and TiP is disrupted and TiP is displaced from TetR. IL-12 is not retained within the endoplasmic reticulum.
Figure 3B:
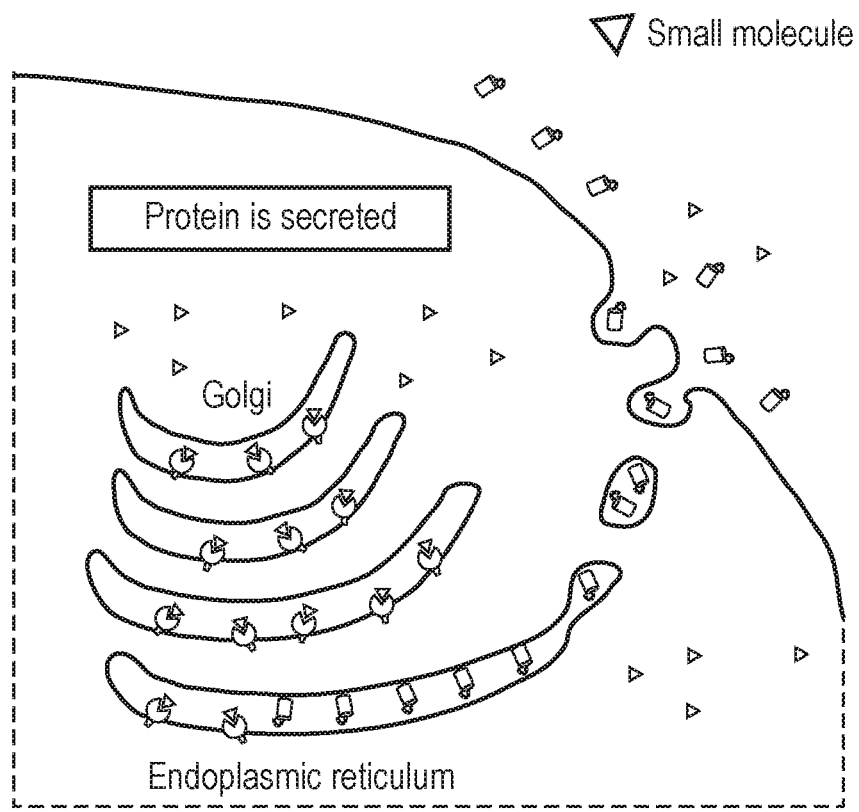

In one embodiment, the releasable protein and the retention protein as defined herein are encoded by the same nucleic acid molecule. This embodiment is shown in FIG. 2.

As used herein, "fusion proteins" are proteins created through the joining of two or more nucleic acid sequences which code for separate proteins.

Suitably, a releasable protein as defined herein may be a fusion protein and may comprise a POI fused to a first protein interaction domain. Suitably, a releasable protein as defined herein may be a fusion protein which may comprise a POI fused to both a first protein interaction domain and a signal peptide.

The POI may be a secreted protein. Suitably, the present invention provides a method for controlling the release of a secreted protein from a cell, wherein in the POI is a secreted protein.

A "membrane protein" as used herein means a protein which comprises a membrane tethering component which acts as an anchor, tethering the protein to the cell membrane.

The membrane tethering component may comprise a membrane localisation domain. This may be any sequence which causes the protein to be attached to or held in a position proximal to the plasma membrane.

The membrane localisation domain may be or comprise a sequence which causes the nascent polypeptide to be attached initially to the ER membrane. As membrane material "flows" from the ER to the Golgi and finally to the plasma membrane, the protein remains associated with the membrane at the end of the synthesis/translocation process.

The membrane localisation domain may, for example, comprise a transmembrane domain or transmembrane sequence, a stop transfer sequence, a GPI anchor or a myristoylation/prenylation/palmitoylation site.

Alternatively the membrane localisation domain may direct the membrane-tethering component to a protein or other entity which is located at the cell membrane, for example by binding the membrane-proximal entity. The membrane tethering component may, for example, comprise a domain which binds a molecule which is involved in the immune synapse, such as TCR/CD3, CD4 or CD8.

Myristoylation is a lipidation modification where a myristoyl group, derived from myristic acid, is covalently attached by an amide bond to the alpha-amino group of an N-terminal glycine residue. Myristic acid is a 14-carbon saturated fatty acid also known as n-Tetradecanoic acid.

The modification can be added either co-translationally or post-translationally. N-myristoyltransferase (NMT) catalyzes the myristic acid addition reaction in the cytoplasm of cells. Myristoylation causes membrane targeting of the protein to which it is attached, as the hydrophobic myristoyl group interacts with the phospholipids in the cell membrane.

The membrane tethering component of the present invention may comprise a sequence capable of being myristoylated by a NMT enzyme. The membrane tethering component of cell of the present invention may comprise a myristoyl group when expressed in a cell.

The membrane tethering component may comprise a consensus sequence such as: $NH_2-G_1-X_2-X_3-X_4-S_5-X_6-X_7-X_8$ which is recognised by NMT enzymes.

Palmitoylation is the covalent attachment of fatty acids, such as palmitic acid, to cysteine and less frequently to serine and threonine residues of proteins. Palmitoylation enhances the hydrophobicity of proteins and can be used to induce membrane association. In contrast to prenylation and myristoylation, palmitoylation is usually reversible (because the bond between palmitic acid and protein is often a thioester bond). The reverse reaction is catalysed by palmitoyl protein thioesterases.

In signal transduction via G protein, palmitoylation of the a subunit, prenylation of the γ subunit, and myristoylation is involved in tethering the G protein to the inner surface of the plasma membrane so that the G protein can interact with its receptor.

The membrane tethering component may comprise a sequence capable of being palmitoylated. The membrane tethering component may comprise additional fatty acids when expressed in a cell which causes membrane localisation.

Prenylation (also known as isoprenylation or lipidation) is the addition of hydrophobic molecules to a protein or chemical compound. Prenyl groups (3-methyl-but-2-en-1-yl) facilitate attachment to cell membranes, similar to lipid anchors like the GPI anchor.

Protein prenylation involves the transfer of either a farnesyl or a geranyl-geranyl moiety to C-terminal cysteine(s) of the target protein. There are three enzymes that carry out prenylation in the cell, farnesyl transferase, Caax protease and geranylgeranyl transferase I.

The membrane tethering component may comprise a sequence capable of being prenylated. The membrane-tethering component may comprise one or more prenyl groups when expressed in a cell which causes membrane localisation.

A "transmembrane domain" as used herein is the sequence of a protein which spans the membrane. A transmembrane domain may be any protein structure which is thermodynamically stable in a membrane. This is typically an alpha helix comprising of several hydrophobic residues. The transmembrane domain of any transmembrane protein can be used to supply the transmembrane portion of a membrane protein according to the present invention.

The presence and span of a transmembrane domain of a protein can be determined by those skilled in the art using the TMHMM algorithm (www.cbs.dtu.dk/services/TMHMM-2.0/). Further, given that the transmembrane domain of a protein is a relatively simple structure, i.e. a polypeptide sequence predicted to form a hydrophobic alpha helix of sufficient length to span the membrane, an artificially designed TM domain may also be used (U.S. Pat. No. 7,052,906 B1 describes synthetic transmembrane components).

The POI may be a membrane protein (e.g. a protein comprising a membrane tethering component, a protein comprising a transmembrane domain). Suitably, the POI may be any type of membrane protein including without limitation: Types I, II and II (single pass molecules) and type IV (multiple-pass molecules) membrane proteins. Suitably, the present invention provides a method for controlling the release of a membrane protein from inside the cell so that it is translocated to the plasma membrane of the cell, wherein the POI is a membrane protein.

Examples of membrane proteins which may be used in the present invention include but are not limited to: Src family kinases (e.g. Fyn, Src, Lck), 4-1 BBL, CD40L, OX40, CD148, CD45, SHP-1 or SHP-2, CTLA4, PD-1, LAG-3, 2B4, BTLA 1, CD28, ICOS. CD33, CD31, CD27, CD30, GITR or HVEM or Siglec-5, 6, 7, 8, 9, 10 or 11 and chimeric tumour necrosis factor (TNF) receptors. Other examples of membrane proteins which may be used in the present invention include membrane-bound cytokines, such as IL2, IL17 and IL15.

As used herein an "enhancer" means a protein which is capable of enhancing the activity (e.g. signalling) and/or persistence of a cytolytic immune cell according to the present invention. For example, the enhancer may be capable of enhancing cell activation, antigen responsiveness, proliferation and/or persistence of the cytolytic immune cell according to the present invention.

Suitably, the enhancer may comprise a membrane tethering component and an enhancer domain.

A "membrane tethering component" acts as an anchor, tethering the signal enhancing component or signal dampening component to the intracellular surface of the cell membrane.

Suitably the enhancer domain may be a signal a phosphorylation amplification domain (e.g. kinase).

The phosphorylation amplification domain may be a phosphorylating amplifying endodomain which can either directly or indirectly amplify the phosphorylation of an ITAM. For example, the phosphorylating amplifying endodomain may be able to directly or indirectly amplify the phosphorylation of one or more ITAM(s)

An example of direct amplification of phosphorylation is phosphorylation by a kinase. The tyrosine kinase domain of a SRC family kinase (SRK) protein can directly phosphorylate the tyrosine residues on ITAMs.

An example of indirect amplification of phosphorylation is via recruitment of a kinase. For example, the intracellular domains of CD4 and CD8 co-receptors indirectly amplify phosphorylation of ITAMs by clustering with the CAR T cell antigen complex, recruiting further SRK proteins, which then directly phosphorylate the ITAMs. These co-receptors also further stabilise the CAR T cell antigen complex, which optimizes signalling through the CAR T cell receptor complex required for T cell activation.

The phosphorylating amplifying domain may comprise all or part of the tyrosine kinase domain of an SRK protein.

Alternatively or additionally, the phosphorylating amplifying domain may comprise all or part of the intracellular domain of a CD4 co-receptor or the CD8 co-receptor.

The enhancer domain may be a factor which protects the cell against the tumour microenvironment, for example 4-1 BBL or CD40L.

The enhancer domain may be a chimeric tumour necrosis factor (TNF) receptor.

Suitably the chimeric TNF receptor may comprise a binding domain which is capable of binding a TNFR ligand; and a TNFR signalling domain. Suitably, the antigen-binding domain may comprise the ligand binding domain of D3R, HVEM, CD27, CD40, RANK or Fn14. Suitably, the signalling domain may comprise the signalling portion of the 4-1BB, OX40, or GITR endodomain.

In one embodiment the POI (such as a membrane POI) may be an enhancer.

As used herein "dampener" or a "signal-damper" means a protein which inhibits signalling when located on the intracellular side of the cell membrane.

For example, the dampener may inhibit CAR-mediated or TCR-mediated signalling when located proximal to the CAR or TCR endodomain.

The signal dampener may inhibit CAR- or TCR-mediated cell signalling completely, effectively "turning off" CAR mediated cell activation. Alternatively the signal dampener may cause partial inhibition, effectively "turning down" CAR-mediated cell signalling.

The presence of the signal dampener may result in signalling through the signalling component which is 2, 5, 10, 50, 100, 1,000 or 10,000-fold lower than the signalling which occurs in the absence of the signal dampener.

CAR- or TCR-mediated signalling may be determined by a variety of methods known in the art. Such methods include assaying signal transduction, for example assaying levels of specific protein tyrosine kinases (PTKs), breakdown of phosphatidylinositol 4,5-biphosphate (PIP2), activation of protein kinase C (PKC) and elevation of intracellular calcium ion concentration. Functional readouts, such as clonal expansion of T cells, upregulation of activation markers on the cell surface, differentiation into effector cells and induction of cytotoxicity or cytokine (e.g. IL-2) secretion may also be utilised.

Suitably, the dampener may comprise a membrane tethering component and a signal dampening domain.

The signal dampening domain may comprise a phosphatase, such as a phosphatase capable of dephosphorylating an ITAM.

The signal dampening domain of the signal dampener may comprise all of part of a receptor-like tyrosine phosphatase. The phospatase may interfere with the phosphorylation and/or function of elements involved in T-cell signalling, such as PLCγ1 and/or LAT.

The signal dampening domain may comprise the phosphatase domain of one or more phosphatases which are involved in controlling T-cell activation, such as CD148, CD45, SHP-1 or SHP-2.

Suitably the release of a dampener (e.g. a phosphatase) from an intracellular compartment to the membrane dampens CAR- or TCR-mediated cell signalling.

The signal dampening domain of the signal dampening component may comprise all or part of the endodomain of an immunoregulatory molecule which inhibits T cell signalling. For example, the signal dampening domain may comprise the endodomain from an immunoinhibitory receptor which inhibits T cell activation. The inhibitory receptor may be a member of the CD28 or Siglec family such as CTLA4, PD-1, LAG-3, 2B4, BTLA 1, CD28, ICOS. CD33, CD31, CD27, CD30, GITR or HVEM or Siglec-5, 6, 7, 8, 9, 10 or 11.

The signal dampening domain may comprise one or more immunoreceptor tyrosine-based inhibition motifs (ITIMs).

An ITIM is a conserved sequence of amino acids (S/I/V/LxYxxI/V/L) that is found in the cytoplasmic tails of many inhibitory receptors of the immune system. After ITIM-possessing inhibitory receptors interact with their ligand, their ITIM motif becomes phosphorylated by enzymes of the Src kinases.

Immune inhibitory receptors such as PD1, PDCD1, BTLA4, LILRB1, LAIR1, CTLA4, 2B4, GP49B, Pir-B, PECAM-1, CD22, Siglec 7, Siglec 9, KLRG1, ILT2, CD94-NKG2A, CD5 and the Killer inhibitory receptor family (KIR) including KIR2DL1, KIR2DL4, KIR2DL5, KIR3DL1 and KIR3DL3 contain ITIMs.

Tyrosine-protein kinase CSK (C-terminal Src kinase) is an enzyme (UniProt ID: P41240 [www.uniprot.org/uniprot/P41240]) which phosphorylates tyrosine residues located in the C-terminal end of Src-family kinases. The signal dampening domain may comprise the tyrosine kinase domain of CSK.

In one embodiment the POI (such as a membrane POI) may be a dampener.

Suitably, the POI may be a dampener when the engineered cytolytic immune cell according to the present invention comprises a CAR or transgenic TCR.

Signal Peptide

The classical protein secretion pathway is through the endoplasmic reticulum (ER). The releasable protein and the retention protein described herein may comprise a signal sequence so that when the proteins are expressed inside a cell, the nascent protein is directed to the ER.

The term "signal peptide" is synonymous with "signal sequence".

A signal peptide is a short peptide, commonly 5-30 amino acids long, typically present at the N-terminus of the majority of newly synthesized proteins that are destined towards the secretory pathway. These proteins include those that reside either inside certain organelles (for example, the endoplasmic reticulum, Golgi or endosomes), are secreted from the cell, and transmembrane proteins.

Signal peptides commonly contain a core sequence which is a long stretch of hydrophobic amino acids that has a tendency to form a single alpha-helix. The signal peptide may begin with a short positively charged stretch of amino acids, which helps to enforce proper topology of the polypeptide during translocation. At the end of the signal peptide there is typically a stretch of amino acids that is recognized and cleaved by signal peptidase. Signal peptidase may cleave either during or after completion of translocation to generate a free signal peptide and a mature protein. The free signal peptides are then digested by specific proteases.

The signal peptide is commonly positioned at the amino terminus of the molecule, although some carboxy-terminal signal peptides are known.

Signal sequences typically have a tripartite structure, consisting of a hydrophobic core region (h-region) flanked by an n- and c-region. The latter contains the signal peptidase (SPase) consensus cleavage site. Usually, signal sequences are cleaved off co-translationally, the resulting cleaved signal sequences are termed signal peptides.

Signal sequences can be detected or predicted using software techniques (see for example, www.predisi.de/).

A very large number of signal sequences are known, and are available in databases. For example, www.signalpeptide.de lists 2109 confirmed mammalian signal peptides in its database.

In one embodiment, the protein may be operably linked to a signal peptide which enables translocation of the protein into the endoplasmic reticulum (ER). The protein may be engineered to be operably linked to a signal peptide which enables translocation of the protein into the ER. Suitably, the protein may operably linked to a signal peptide which is not normally operably linked to in nature. Suitably, the combination of the protein and the signal peptide may be synthetic (e.g. not found in nature).

In some embodiments an altered signal peptide (such as a less efficient signal peptide) may be used. The use of an altered signal peptide may allow the system to be tuned according to clinical need. For example, in some embodiments, the use of a less efficient signal peptide reduces leak from the system e.g. less secretion or translocation in the absence of the agent.

The ratio of proteins may be modified by modulating the efficiency of one or more of the signal peptides on the two proteins. Methods for modulating the efficiency of signal peptides are described in WO2016/174409 (which is incorporated herein by reference).

Suitably, the signal peptide may be a murine Ig kappa chain V-III region signal peptide or a variant thereof. The amino acid sequence of a murine Ig kappa chain V-III region signal peptide is set forth in SEQ ID NO: 25. Suitably, the signal peptide may comprise SEQ ID NO 25 or a variant thereof.

```
                                           (SEQ ID NO: 25)
METDTLLLWVLLLWVPGSTG.
```

Suitably the amino acid sequence of a variant murine Ig kappa chain V-III region signal peptide may comprise the sequence set forth in SEQ ID NO: 26.

```
                                           (SEQ ID NO: 26)
METDTLLLKVLLLWVPGSTG.
```

This variant murine Ig kappa chain V-III region signal peptide sequence comprises a lysine mutation at amino acid position number nine (underlined), with respect to the wild-type sequence set forth in SEQ ID NO: 26. Suitably, the signal peptide may comprise SEQ ID NO 26 or a variant thereof.

This substitution of a lysine mutation at amino acid position number nine reduces the efficiency of the signal peptide, thereby reducing the amount of protein which enters the ER and reducing the total amount of protein secreted or translocated to the membrane.

Suitably, the signal peptide may be a murine Ig heavy chain V region signal peptide sequence. The amino acid sequence of a murine Ig heavy chain V region signal peptide is set forth in SEQ ID NO: 27. Suitably, the signal peptide may comprise a sequence set forth in SEQ ID NO: 27 or a variant thereof.

```
                                           (SEQ ID NO: 27)
MGWSCIILFLVATATGVHS.
```

Variant sequences of SEQ ID NO: 25-27 may have at least 80%, 85%, 90%, 95%, 98% or 99% sequence identity to SEQ ID NO: 25-27, provided that the sequence is able to function as a signal peptide. The variant sequence retains the ability to direct the nascent protein to the ER.

In another embodiment, the protein may be operably linked to a signal peptide which enables translocation of the protein into the ER. Suitably, the protein may be operably linked to a signal peptide which it is normally operably linked to in nature. Suitably, the protein may comprise a wild-type signal peptide, e.g. the combination of the protein and signal peptide is naturally occurring.

In some embodiments, the POI is a membrane protein and is anchored to the lipid membrane with a stop-transfer anchor sequence. In other embodiments, the POI is a membrane protein and is anchored to the lipid membrane with a signal-anchor sequence. In other embodiments, the POI is a membrane protein and its N-terminal domain is targeted to the cytosol. In a further embodiment, the POI is a membrane protein and its N-terminal domain is targeted to the lumen.

Agent

The interaction between the first and second protein interaction domains is a conditional interaction according to the presence or absence of an agent.

The agent may be capable of being delivered to the cytoplasm or intracellular compartment of a cell and being available for intracellular binding.

Suitably, the agent may be a small molecule. The agent may be a small molecule such as: a steroid, methotrexate, caffeine, cocaine or an antibiotic.

A steroid is an organic compound with four "fused" carbon rings. Examples of steroids include the dietary lipid cholesterol, the sex hormones estradiol and testosterone and the anti-inflammatory drug dexamethasone.

The steroid core structure is composed of seventeen carbon atoms, bonded in four "fused" rings: three six-member cyclohexane rings (rings A, B and C in the first illustration) and one five-member cyclopentane ring (the D ring). Steroids vary by the functional groups attached to this four-ring core and by the oxidation state of the rings. Sterols are forms of steroids with a hydroxyl group at position three and a skeleton derived from cholestane.

Methotrexate (MTX), formerly known as amethopterin, is an antimetabolite and antifolate drug.

Caffeine is a purine, a methylxanthine alkaloid. It is a stimulant of the central nervous system, but is generally recognised as safe (GRAS) by the Food and Dru Administration. Toxic doses, over 10 grams per day for an adult, are much higher than typical dose of under 500 milligrams per day. A cup of coffee contains 80-175 mg of caffeine.

Cocaine, also known as benzoylmethylecgonine or coke, is a strong stimulant. Various analogs of cocaine (methyl (1R,2R,3S,5S)-3-(benzoyloxy)-8-methyl-8-azabicyclo [3.2.1]octane-2-carboxylate) are known including stereoisomers; 3β-phenyl ring substituted analogues; 2β-substituted analogues; N-modified analogues of cocaine; 3β-carbamoyl analogues; 3β-alkyl-3-benzyl tropanes; 6/7-substituted cocaines; 6-alkyl-3-benzyl tropanes; and piperidine homologues.

Antibiotics or antibacterials are a type of antimicrobial used in the treatment and prevention of bacterial infection. Antibacterial antibiotics are commonly classified based on their mechanism of action, chemical structure, or spectrum of activity. Most target bacterial functions or growth processes. Those that target the bacterial cell wall (penicillins and cephalosporins) or the cell membrane (polymyxins), or interfere with essential bacterial enzymes (rifamycins, lipiarmycins, quinolones, and sulfonamides) have bactericidal activities. Those that target protein synthesis (macrolides, lincosamides and tetracyclines) are usually bacteriostatic (with the exception of bactericidal aminoglycosides). Further categorization is based on their target specificity. "Narrow-spectrum" antibacterial antibiotics target specific types of bacteria, such as Gram-negative or Gram-positive bacteria, whereas broad-spectrum antibiotics affect a wide range of bacteria. Four new classes of antibacterial antibiotics have been brought into clinical use in the last ten years: cyclic lipopeptides (such as daptomycin), glycylcyclines (such as tigecycline), oxazolidinones (such as linezolid), and lipiarmycins (such as fidaxomicin).

The agent may, for example, be an antibiotic such as tetracycline, or a derivative thereof such as doxycycline or minocycline.

Intracellular Retention Domain

A "retention protein" as used herein means a protein which comprises an intracellular retention domain.

Suitably, the retention protein may comprise an intracellular retention domain and a second protein interaction domain.

The intracellular retention domain may be any protein or protein domain which is a resident of a given intracellular compartment. This means that said protein or domain is in majority, located in a given compartment. At least 80%, 85%, 90%, 95%, 96%, 97%, 98% or 99% of said protein or domain is located in said compartment in a cell. The retention domain prevents a protein of interest according to the present invention from being secreted from the cell or from being translocated to the plasma membrane in the absence of the agent.

As used herein "compartment" or "subcellular compartment" refers to a given subdomain of cell. A compartment may be an organelle (such as endoplasmic reticulum, Golgi apparatus, endosome, lysosome) or an element of an organelle (such as multi-vesicular bodies of endosomes, cis- medial- or trans-cisternae of the Golgi apparatus etc.) or the plasma membrane or sub-domains of the plasma membrane (such as apical, basolateral, axonal domains) or micro domains such as focal adhesions or tight junctions.

An "intracellular compartment" refers to a compartment within a cell.

According to the present invention, the POI may be retained within the cell or within a specific intracellular compartment by a conditional interaction between a first and second protein interaction domain, wherein one of the protein interaction domains comprises an intracellular retention domain.

The classical protein secretion pathway is through the ER. Secreted proteins typically have a signal peptide which results in translocation of the protein into the ER. Secreted proteins do not have a transmembrane domain and continue through the ER and out to the cell surface where they are not retained to the membrane.

Type 1 membrane-bound proteins typically comprise a signal peptide and are anchored to the lipid membrane with a stop-transfer anchor sequence. Type II, III and multi-spanning membrane-bound proteins may be targeted to the secretory pathway by a transmembrane domain, which is similar to a signal sequence except that it is not cleaved and are typically anchored with a signal-anchor sequence.

Some signal peptides contain Golgi retention motifs. These proteins enter the ER but due to recognition of Golgi retention motifs, are shuttled back to the Golgi and are not secreted.

The retention domain may be a protein or domain which is resident in the Golgi. Suitably, the Golgi retention domain may be selected from the group comprising: Giantin (GolgB1, GenBank Accession number NM+004487.3), TGN38/46, Menkes receptor and Golgi enzymes such as ManII (α-1,3-1,6 mannosidase, Genbank accession number NM_008549), Sialyl Transferase (β-galactosamide α2,6-sialytransferae 1, NM_003032), GalT (β-1,4-galactosyl-transferase 1, NM_001497) adenoviral E19, HLA invariant chain or fragments thereof comprising the localisation domains.

The intracellular retention domain maybe a Golgi retention domain. The Golgi retention domain may be selected from the group comprising: a SEKDEL (SEQ ID NO: 28) sequence, a KDEL (SEQ ID NO: 29) sequence, a KKXX (SEQ ID NO:30) motif, a KXKXX (SEQ ID NO: 31) motif, a tail of adenoviral E19 protein comprising the sequence KYKSRRSFIDEKKMP (SEQ ID NO:32), or a fragment of human leukocyte antigen (HLA) invariant chain comprising the sequence MHRRRSRSCR (SEQ ID NO:33).

Suitably, the retention domain may be a KDEL (SEQ ID NO: 29) sequence. The KDEL sequence prevents the protein from being secreted from the ER. A protein having a KDEL sequence will be retrieved from the Golgi apparatus by retrograde transport to the ER lumen. Proteins only leave the ER after the KDEL sequence has been cleaved off. Thus the protein resident in the ER will remain in the ER as long as it contains a KDEL sequence.

Suitably, the retention domain may be a KKXX (SEQ ID NO:30) motif. Suitably the KKXX domain may be located that the C terminus of the protein. KKXX is responsible for retrieval of ER membrane proteins from the cis end of the Golgi apparatus by retrograde transport, via interaction with the coat protein (COPI) complex.

Suitably, the retention domain may be a KXKXX (SEQ ID NO: 31) motif.

Suitably, the retention domain may be a tail of adenoviral E19 protein comprising the sequence

```
                                           (SEQ ID NO: 32)
              KYKSRRSFIDEKKMP.
```

Suitably, the retention domain may be an N-terminal fragment of the invariant chain of HLA comprising the sequence MHRRRSRSCR (SEQ ID NO: 33).

The retention domain may be a protein or domain which is resident in the ER.

The ER retention domain may selected from the group comprising: an isoform of the invariant chain which resides in the ER (Ii33), Ribophorin I, Ribophorin II, SEC61 or cytochrome b5 or fragments thereof comprising the localisation domains. An example of an ER localisation domain is the ER localisation of Ribophorin II, Genbank accession BC060556.1.

The intracellular retention domain maybe an ER retention domain.

The retention domain may be a protein or domain which is resident in the plasma membrane.

The intracellular retention domain maybe a plasma membrane retention domain.

The plasma membrane retention domain may be selected from Glycosylphosphatidylinositol (GPI)-anchored proteins, such as Thy-1 cell surface antigen (Thy-1) and prion protein (PRNP).

The retention domain may be C-terminal to the protein interaction domain.

The retention domain may be N terminal to the protein interaction domain.

Suitably, a retention protein as defined herein may comprise an intracellular retention domain operably linked to a second protein interaction domain as defined herein. The intracellular retention domain may be operably linked to a both a signal peptide and a second protein interaction domain as defined herein.

Suitably, a retention protein as defined herein may be a fusion protein and may comprise an intracellular retention domain fused to a second protein interaction domain. Suitably, a retention protein as defined herein may be a fusion protein which may comprise an intracellular retention domain fused to both a second protein interaction domain and a signal peptide and/or a transmembrane domain. Suitably, a retention protein as defined herein may be a fusion protein and may comprise a second protein interaction domain fused to both an intracellular domain and to a signal peptide and/or a transmembrane domain.

Cell

The present invention relates to an engineered cytolytic immune cell comprising: a releasable protein which comprises a polypeptide of interest (POI) and a first interaction domain; and a retention protein which is retained within an intracellular compartment of the cell and comprises a second interaction domain; wherein the first protein interaction domain and second protein interaction domain are capable of a conditional interaction according to the presence or absence of an agent.

The cell may comprise a first nucleic acid sequence encoding a releasable protein which comprises a protein of interest (POI) a first protein interaction domain and a signal peptide; and a second nucleic acid sequence encoding a retention protein, which comprises a second protein interaction domain, an intracellular retention domain and a signal peptide; wherein the first protein interaction domain and second protein interaction domain are capable of a conditional interaction according to the presence or absence of an agent.

In some embodiments, the POI is a secretory protein and is secreted by the cell in the presence of the agent.

In some embodiments, the POI is a membrane protein and is exported to the plasma membrane in the presence of the agent. The present invention also relates to an engineered cytolytic immune cell obtainable (or obtained) by methods of the invention.

In some embodiments, the engineered cytolytic immune cell according to the present invention further comprises a chimeric antigen receptor (CAR) or transgenic T cell receptor (TCR).

An "engineered cell" as used herein means a cell which has been modified to comprise or express a nucleic acid sequence which is not naturally encoded by the cell. Methods for engineering cells are known in the art and include but are not limited to genetic modification of cells e.g. by transduction such as retroviral or lentiviral transduction, transfection (such as transient transfection—DNA or RNA based) including lipofection, polyethylene glycol, calcium phosphate and electroporation. Any suitable method may be used to introduce a nucleic acid sequence into a cell.

Accordingly, the first and second nucleic acid sequences encoding the releasable protein and the retention protein respectively are not naturally expressed by a corresponding, unmodified cell—for example an unmodified alpha-beta T cell, a NK cell, a gamma-delta T cell or cytokine-induced killer cell.

Suitably, an engineered cell is a cell whose genome has been modified e.g. by transduction or by transfection. Suitably, an engineered cell is a cell whose genome has been modified by retroviral transduction. Suitably, an engineered cell is a cell whose genome has been modified by lentiviral transduction.

As used herein, the term "introduced" refers to methods for inserting foreign DNA or RNA into a cell. As used herein the term introduced includes both transduction and transfection methods. Transfection is the process of introducing nucleic acids into a cell by non-viral methods. Transduction is the process of introducing foreign DNA or RNA into a cell via a viral vector.

Engineered cells according to the present invention may be generated by introducing DNA or RNA coding for the releasable protein and the retention protein by one of many means including transduction with a viral vector, transfection with DNA or RNA.

Cells may be activated and/or expanded prior to the introduction of a nucleic acid sequence encoding the releasable protein and the retention protein, for example by treatment with an anti-CD3 monoclonal antibody or both anti-CD3 and anti-CD28 monoclonal antibodies. As used herein "activated" means that a cell has been stimulated, causing the cell to proliferate, differentiate or initiate an effector function.

Methods for measuring cell activation are known in the art and include, for example, measuring the expression of activation markers by flow cytometry, such as the expression of CD69, CD25, CD38 or HLA-DR or measuring intracellular cytokines.

As used herein "expanded" means that a cell or population of cells has been induced to proliferate.

The expansion of a population of cells may be measured for example by counting the number of cells present in a population. The phenotype of the cells may be determined by methods known in the art such as flow cytometry.

"Cytolytic immune cell" as used herein is a cell which directly kills other cells. Cytolytic cells may kill cancerous cells; virally infected cells or other damaged cells. Cytolytic immune cells include T cells and Natural killer (NK) cells.

Cytolytic immune cells can be T cells or T lymphocytes which are a type of lymphocyte that play a central role in cell-mediated immunity. T cells can be distinguished from other lymphocytes, such as B cells and NK cells, by the presence of a TCR on their cell surface.

Cytolytic T cells (TC cells, or CTLs) destroy virally infected cells and tumour cells, and are also implicated in transplant rejection. CTLs express the CD8 at their surface. CTLs may be known as CD8+ T cells. These cells recognize their targets by binding to antigen associated with MHC class I, which is present on the surface of all nucleated cells. Through IL-10, adenosine and other molecules secreted by regulatory T cells, the CD8+ cells can be inactivated to an anergic state, which prevent autoimmune diseases such as experimental autoimmune encephalomyelitis.

Suitably, the cell of the present invention may be a T-cell. Suitably, the T cell may be an alpha-beta T cell. Suitably, the T cell may be a gamma-delta T cell.

Natural Killer Cells (or NK cells) are a type of cytolytic cell which form part of the innate immune system. NK cells provide rapid responses to innate signals from virally infected cells in an MHC independent manner.

NK cells (belonging to the group of innate lymphoid cells) are defined as large granular lymphocytes (LGL) and constitute the third kind of cells differentiated from the common lymphoid progenitor generating B and T lymphocytes. NK cells are known to differentiate and mature in the bone marrow, lymph node, spleen, tonsils and thymus where they then enter into the circulation.

Suitably, the cell of the present invention may be a wild-type killer (NK) cell. Suitably, the cell of the present invention may be a cytokine induced killer cell.

The cell may be derived from a patient's own peripheral blood (1st party), or in the setting of a haematopoietic stem cell transplant from donor peripheral blood (2nd party), or peripheral blood from an unconnected donor (3rd party). T or NK cells, for example, may be activated and/or expanded prior to being transduced with nucleic acid molecule(s) encoding the polypeptides of the invention, for example by treatment with an anti-CD3 monoclonal antibody.

Alternatively, the cell may be derived from ex vivo differentiation of inducible progenitor cells or embryonic progenitor cells to T cells. Alternatively, an immortalized T-cell line which retains its lytic function may be used.

The cell may be a haematopoietic stem cell (HSC). HSCs can be obtained for transplant from the bone marrow of a suitably matched donor, by leukapheresis of peripheral blood after mobilization by administration of pharmacological doses of cytokines such as G-CSF [peripheral blood stem cells (PBSCs)], or from the umbilical cord blood (UCB) collected from the placenta after delivery. The marrow, PBSCs, or UCB may be transplanted without processing, or the HSCs may be enriched by immune selection with a monoclonal antibody to the CD34 surface antigen.

Chimeric Antigen Receptor (CAR)

Classical CARs are chimeric type I trans-membrane proteins which connect an extracellular antigen-recognizing domain (binder) to an intracellular signalling domain (endodomain). The binder is typically a single-chain variable fragment (scFv) derived from a monoclonal antibody (mAb), but it can be based on other formats which comprise an antibody-like antigen binding site or on a ligand for the target antigen. A spacer domain may be necessary to isolate the binder from the membrane and to allow it a suitable orientation. A common spacer domain used is the Fc of IgG1. More compact spacers can suffice e.g. the stalk from CD8a and even just the IgG1 hinge alone, depending on the antigen. A trans-membrane domain anchors the protein in the cell membrane and connects the spacer to the endodomain.

Early CAR designs had endodomains derived from the intracellular parts of either the γ chain of the FcεR1 or CD3ζ. Consequently, these first generation receptors transmitted immunological signal 1, which was sufficient to trigger T-cell killing of cognate target cells but failed to fully activate the T-cell to proliferate and survive. To overcome this limitation, compound endodomains have been constructed: fusion of the intracellular part of a T-cell co-stimulatory molecule to that of CD3ζ results in second generation receptors which can transmit an activating and co-stimulatory signal simultaneously after antigen recognition. The co-stimulatory domain most commonly used is that of CD28. This supplies the most potent co-stimulatory signal—namely immunological signal 2, which triggers T-cell proliferation. Some receptors have also been described which include TNF receptor family endodomains, such as the closely related OX40 and 4-1 BB which transmit survival signals. Even more potent third generation CARs have now been described which have endodomains capable of transmitting activation, proliferation and survival signals.

CAR-encoding nucleic acids may be transferred to T cells using, for example, retroviral vectors. In this way, a large number of antigen-specific T cells can be generated for adoptive cell transfer. When the CAR binds the target-antigen, this results in the transmission of an activating signal to the T-cell it is expressed on. Thus the CAR directs the specificity and cytotoxicity of the T cell towards cells expressing the targeted antigen.

Antigen Binding Domain

The antigen-binding domain is the portion of a classical CAR which recognizes antigen.

Numerous antigen-binding domains are known in the art, including those based on the antigen binding site of an antibody, antibody mimetics, and T-cell receptors. For example, the antigen-binding domain may comprise: a single-chain variable fragment (scFv) derived from a monoclonal antibody; a wild-type ligand of the target antigen; a peptide with sufficient affinity for the target; a single domain binder such as a camelid; an artificial binder single as a Darpin; or a single-chain derived from a T-cell receptor.

Various tumour associated antigens (TAA) are known, as shown in the following Table 1. The antigen-binding domain used in the present invention may be a domain which is capable of binding a TAA as indicated therein.

TABLE 1

| Cancer type | TAA |
| --- | --- |
| Diffuse Large B-cell Lymphoma | CD19, CD20 |
| Breast cancer | ErbB2, MUC1 |
| AML | CD13, CD33 |
| Neuroblastoma | GD2, NCAM, ALK, GD2 |
| B-CLL | CD19, CD52, CD160 |
| Colorectal cancer | Folate binding protein, CA-125 |
| Chronic Lymphocytic Leukaemia | CD5, CD19 |
| Glioma | EGFR, Vimentin |
| Multiple myeloma | BCMA, CD138 |
| Renal Cell Carcinoma | Carbonic anhydrase IX, G250 |
| Prostate cancer | PSMA |
| Bowel cancer | A33 |

Transmembrane Domain

The transmembrane domain is the sequence of a classical CAR that spans the membrane. It may comprise a hydrophobic alpha helix. The transmembrane domain may be derived from CD28, which gives good receptor stability.

CAR or TCR Signal Peptide

The CAR or transgenic TCR for use in the present invention may comprise a signal peptide so that when it is expressed in a cell, such as a T-cell, the nascent protein is directed to the endoplasmic reticulum and subsequently to the cell surface, where it is expressed.

The core of the signal peptide may contain a long stretch of hydrophobic amino acids that has a tendency to form a single alpha-helix. The signal peptide may begin with a short positively charged stretch of amino acids, which helps to enforce proper topology of the polypeptide during translocation. At the end of the signal peptide there is typically a stretch of amino acids that is recognized and cleaved by signal peptidase. Signal peptidase may cleave either during or after completion of translocation to generate a free signal peptide and a mature protein. The free signal peptides are then digested by specific proteases.

Spacer Domain

The receptor may comprise a spacer sequence to connect the antigen-binding domain with the transmembrane domain. A flexible spacer allows the antigen-binding domain to orient in different directions to facilitate binding.

The spacer sequence may, for example, comprise an IgG1 Fc region, an IgG1 hinge or a human CD8 stalk or the mouse CD8 stalk. The spacer may alternatively comprise an alternative linker sequence which has similar length and/or domain spacing properties as an IgG1 Fc region, an IgG1 hinge or a CD8 stalk. A human IgG1 spacer may be altered to remove Fc binding motifs.

Intracellular Signalling Domain

The intracellular signalling domain is the signal-transmission portion of a classical CAR.

The most commonly used signalling domain component is that of CD3-zeta endodomain, which contains 3 ITAMs. This transmits an activation signal to the T cell after antigen is bound. CD3-zeta may not provide a fully competent activation signal and additional co-stimulatory signalling may be needed. For example, chimeric CD28 and OX40 can be used with CD3-Zeta to transmit a proliferative/survival signal, or all three can be used together.

The intracellular signalling domain may be or comprise a T cell signalling domain.

The intracellular signalling domain may comprise one or more immunoreceptor tyrosine-based activation motifs (ITAMs). An ITAM is a conserved sequence of four amino acids that is repeated twice in the cytoplasmic tails of certain cell surface proteins of the immune system. The motif contains a tyrosine separated from a leucine or isoleucine by any two other amino acids, giving the signature YxxL/I. Two of these signatures are typically separated by between 6 and 8 amino acids in the tail of the molecule (YxxL/Ix$_{(6-8)}$YxxL/I).

ITAMs are important for signal transduction in immune cells. Hence, they are found in the tails of important cell signalling molecules such as the CD3 and ζ-chains of the T cell receptor complex, the CD79 alpha and beta chains of the B cell receptor complex, and certain Fc receptors. The tyrosine residues within these motifs become phosphorylated following interaction of the receptor molecules with their ligands and form docking sites for other proteins involved in the signalling pathways of the cell.

The intracellular signalling domain component may comprise, consist essentially of, or consist of the CD3-ζ endodomain, which contains three ITAMs. Classically, the CD3-ζ endodomain transmits an activation signal to the T cell after antigen is bound.

The intracellular signalling domain may comprise additional co-stimulatory signalling. For example, 4-1 BB (also known as CD137) can be used with CD3-ζ, or CD28 and OX40 can be used with CD3-ζ to transmit a proliferative/survival signal.

Suitably, the CAR may have the general format: antigen-binding domain-TCR element.

As used herein "TCR element" means a domain or portion thereof of a component of the TCR receptor complex. The TCR element may comprise (e.g. have) an extracellular domain and/or a transmembrane domain and/or an intracellular domain e.g. intracellular signalling domain of a TCR element.

The TCR element may selected from TCR alpha chain, TCR beta chain, a CD3 epsilon chain, a CD3 gamma chain, a CD3 delta chain, CD3 epsilon chain.

Suitably, the TCR element may comprise the extracellular domain of the TCR alpha chain, TCR beta chain, a CD3 epsilon chain, a CD3 gamma chain, a CD3 delta chain, or CD3 epsilon chain. Suitably, the TCR element may comprise the transmembrane domain of the TCR alpha chain, TCR beta chain, a CD3 epsilon chain, a CD3 gamma chain, a CD3 delta chain, or CD3 epsilon chain. Suitably, the TCR element may comprise the intracellular domain of the TCR alpha chain, TCR beta chain, a CD3 epsilon chain, a CD3 gamma chain, a CD3 delta chain, or CD3 epsilon chain. Suitably, the TCR element may comprise the TCR alpha chain, TCR beta chain, a CD3 epsilon chain, a CD3 gamma chain, a CD3 delta chain, or CD3 epsilon chain.

Transgenic T-Cell Receptor (TCR)

The T-cell receptor (TCR) is a molecule found on the surface of T cells which is responsible for recognizing fragments of antigen as peptides bound to major histocompatibility complex (MHC) molecules.

The TCR is a heterodimer composed of two different protein chains. In humans, in 95% of T cells the TCR consists of an alpha (α) chain and a beta (β) chain (encoded by TRA and TRB, respectively), whereas in 5% of T cells the TCR consists of gamma and delta (γ/δ) chains (encoded by TRG and TRD, respectively).

When the TCR engages with antigenic peptide and MHC (peptide/MHC), the T lymphocyte is activated through signal transduction.

In contrast to conventional antibody-directed target antigens, antigens recognized by the TCR can include the entire array of potential intracellular proteins, which are processed and delivered to the cell surface as a peptide/MHC complex.

It is possible to engineer cells to express heterologous (i.e. non-native) TCR molecules by artificially introducing the TRA and TRB genes; or TRG and TRD genes into the cell using a vector. For example the genes for engineered TCRs may be reintroduced into autologous T cells and transferred back into patients for T cell adoptive therapies. Such 'heterologous' TCRs may also be referred to herein as 'transgenic TCRs'.

Nucleic Acid Construct/Kit of Nucleic Acid Sequences

The present invention provides a nucleic acid construct which comprises:
  (i) a first nucleic acid sequence encoding a releasable protein as defined herein which may comprise a protein of interest (POI) and a first protein interaction domain; and
  (ii) a second nucleic acid sequence encoding a retention protein, which may comprise a second protein interaction domain and an intracellular retention domain;
    wherein the first protein interaction domain and second protein interaction domain are capable of a conditional interaction according to the presence or absence of an agent; and
  (iii) a third nucleic acid sequence which encodes a CAR or transgenic TCR.

The present invention also provides a kit comprising nucleic acid sequences according to the present invention. For example, the kit may comprise
  (i) a first nucleic acid sequence encoding a releasable protein as defined herein which comprises a protein of interest (POI) and a first protein interaction domain; and
  (ii) a second nucleic acid sequence encoding a retention protein, which may comprise a second protein interaction domain and an intracellular retention domain;
    wherein the first protein interaction domain and second protein interaction domain are capable of a conditional interaction according to the presence or absence of an agent; and
  (iv) a third nucleic acid sequence which encodes a CAR or transgenic TCR.

Suitably, the kit may additionally comprise an agent as defined herein.

As used herein, the terms "polynucleotide", "nucleotide", and "nucleic acid" are intended to be synonymous with each other.

Suitably, the nucleic acid construct may comprise a plurality of nucleic acid sequences which encode components of the invention such as a POI, first and second protein interaction domains, an intracellular retention domain and a CAR or transgenic TCR provided by the present invention.

For example, the nucleic acid construct may comprise two, three, four or more nucleic acid sequences which encode different components of the invention. Suitably, the plurality of nucleic acid sequences may be separated by co-expression sites as defined herein.

It will be understood by a skilled person that numerous different polynucleotides and nucleic acids can encode the same polypeptide as a result of the degeneracy of the genetic code. In addition, it is to be understood that skilled persons may, using routine techniques, make nucleotide substitutions that do not affect the polypeptide sequence encoded by the polynucleotides described herein to reflect the codon usage of any particular host organism in which the polypeptides are to be expressed. Suitably, the polynucleotides of the present invention are codon optimised to enable expression in a mammalian cell, in particular a cytolytic immune cell as described herein.

Nucleic acids according to the invention may comprise DNA or RNA. They may be single-stranded or double-stranded. They may also be polynucleotides which include within them synthetic or modified nucleotides. A number of different types of modification to oligonucleotides are known in the art. These include methylphosphonate and phosphorothioate backbones, addition of acridine or polylysine chains at the 3□ and/or 5□ ends of the molecule. For the purposes of the use as described herein, it is to be understood that the polynucleotides may be modified by any method available in the art. Such modifications may be carried out in order to enhance the in vivo activity or life span of polynucleotides of interest.

The terms "variant", "homologue" or "derivative" in relation to a nucleotide sequence include any substitution of, variation of, modification of, replacement of, deletion of or addition of one (or more) nucleic acid from or to the sequence.

Co-Expression Site

A co-expression site is used herein to refer to a nucleic acid sequence enabling co-expression of nucleic acid sequences encoding the releasable protein and the retention protein of the present invention.

Suitably, there may be a co-expression site between the first nucleic acid sequence and the second nucleic acid sequence. Suitably, there may be a co-expression site between the nucleic acid sequence encoding a releasable protein and the nucleic acid sequence encoding a retention protein and the nucleic acid sequence which encodes the CAR or transgenic TCR.

The co-expression site may be a sequence encoding a cleavage site, such that the engineered polynucleotide encodes the enzymes of the transgenic synthetic biology pathway joined by a cleavage site(s). Typically, a co-expression site is located between adjacent polynucleotide sequences which encode separate enzymes of the transgenic synthetic biology pathway.

Suitably, in embodiments where a plurality of co-expression sites is present in the engineered polynucleotide, the same co-expression site may be used.

Preferably, the co-expression site is a cleavage site. The cleavage site may be any sequence which enables the two polypeptides to become separated. The cleavage site may be self-cleaving, such that when the polypeptide is produced, it is immediately cleaved into individual peptides without the need for any external cleavage activity.

The term "cleavage" is used herein for convenience, but the cleavage site may cause the peptides to separate into individual entities by a mechanism other than classical cleavage. For example, for the Foot-and-Mouth disease virus (FMDV) 2A self-cleaving peptide (see below), various models have been proposed for to account for the "cleavage" activity: proteolysis by a host-cell proteinase, autoproteolysis or a translational effect (Donnelly et al (2001) J. Gen. Virol. 82:1027-1041). The exact mechanism of such "cleavage" is not important for the purposes of the present invention, as long as the cleavage site, when positioned between nucleic acid sequences which encode proteins, causes the proteins to be expressed as separate entities.

The cleavage site may be a furin cleavage site. Furin is an enzyme which belongs to the subtilisin-like proprotein convertase family. The members of this family are proprotein convertases that process latent precursor proteins into their biologically active products. Furin is a calcium-dependent serine endoprotease that can efficiently cleave precursor proteins at their paired basic amino acid processing sites. Examples of furin substrates include proparathyroid hormone, transforming growth factor beta 1 precursor, proalbumin, pro-beta-secretase, membrane type-1 matrix metalloproteinase, beta subunit of pro-nerve growth factor and von Willebrand factor. Furin cleaves proteins just downstream of a basic amino acid target sequence (canonically, Arg-X-(Arg/Lys)-Arg) and is enriched in the Golgi apparatus.

The cleavage site may be a Tobacco Etch Virus (TEV) cleavage site.

TEV protease is a highly sequence-specific cysteine protease which is chymotrypsin-like proteases. It is very specific for its target cleavage site and is therefore frequently used for the controlled cleavage of fusion proteins both in vitro and in vivo. The consensus TEV cleavage site is ENLYFQ\S (where '\' denotes the cleaved peptide bond). Mammalian cells, such as human cells, do not express TEV protease. Thus in embodiments in which the present nucleic acid construct comprises a TEV cleavage site and is expressed in a mammalian cell—exogenous TEV protease must also expressed in the mammalian cell.

The cleavage site may encode a self-cleaving peptide. A 'self-cleaving peptide' refers to a peptide which functions such that when the polypeptide comprising the proteins and the self-cleaving peptide is produced, it is immediately "cleaved" or separated into distinct and discrete first and second polypeptides without the need for any external cleavage activity.

The self-cleaving peptide may be a 2A self-cleaving peptide from an aphtho- or a cardiovirus. The primary 2A/2B cleavage of the aptho- and cardioviruses is mediated by 2A "cleaving" at its own C-terminus. In apthoviruses, such as foot-and-mouth disease viruses (FMDV) and equine rhinitis A virus, the 2A region is a short section of about 18 amino acids, which, together with the N-terminal residue of protein 2B (a conserved proline residue) represents an autonomous element capable of mediating "cleavage" at its own C-terminus (Donelly et al (2001) as above).

"2A-like" sequences have been found in picornaviruses other than aptho- or cardioviruses, 'picornavirus-like' insect viruses, type C rotaviruses and repeated sequences within *Trypanosoma* spp and a bacterial sequence (Donnelly et al., 2001) as above.

The co-expression sequence may be an internal ribosome entry sequence (IRES). The co-expressing sequence may be an internal promoter.

Vector

The present invention also provides a vector, or kit of vectors which comprises one or more nucleic acid sequence (s) or nucleic acid construct(s) of the invention. Such a vector may be used to introduce the nucleic acid sequence(s)

or construct(s) into a host cell so that it expresses a releasable protein, a retention protein and a CAR or transgenic TCR as defined herein.

Suitably, the vector may comprise a plurality of nucleic acid sequences which encode different components as provided by the present invention. For example, the vector may comprise two, three, four or more nucleic acid sequences which encode different of the invention, such as the POI, the protein interaction domains, the intracellular retention domain and a CAR or transgenic TCR. Suitably, the plurality of nucleic acid sequences may be separated by co-expression sites as defined herein.

The vector may, for example, be a plasmid or a viral vector, such as a retroviral vector or a lentiviral vector, or a transposon based vector or synthetic mRNA.

The vector may be capable of transfecting or transducing a cell.

Pharmaceutical Composition

The present invention also relates to a pharmaceutical composition comprising an engineered cytolytic immune cell according to the present invention or a cell obtainable (e.g. obtained) by a method according to the present invention.

The present invention also provides a pharmaceutical composition comprising, a nucleic acid construct according to the present invention, a first, second and third nucleic acid sequence as defined herein; a vector according to the present invention or a first, second and third vector as described herein. In particular, the invention relates to a pharmaceutical composition containing a cell according to the present invention.

The pharmaceutical composition may additionally comprise a pharmaceutically acceptable carrier, diluent or excipient. The pharmaceutical composition may optionally comprise one or more further pharmaceutically active polypeptides and/or compounds. Such a formulation may, for example, be in a form suitable for intravenous infusion.

Method of Treatment

The present invention provides a method for treating and/or preventing a disease which comprises the step of administering an engineered cytolytic immune cell according to the invention, or obtainable (e.g. obtained) by a method according to the present invention, or a nucleic acid construct according to the present invention, or a first, second and third nucleic acid sequence as defined herein; a vector according to the present invention or a first, second and third vector as described herein (for example in a pharmaceutical composition as described above) to a subject.

Suitably, the present methods for treating and/or preventing a disease may comprise administering an engineered cytolytic immune cell according to the present invention (for example in a pharmaceutical composition as described above) to a subject.

The present invention also provides a method for treating and/or preventing a disease in a subject which subject comprises cells of the invention, which method comprises the step of administering an agent to the subject. As such, this method involves administering an agent to a subject which already comprises cells of the present invention.

Suitably, the present methods for treating and/or preventing a disease may comprise administering an agent as defined herein to a subject to which the engineered cytolytic immune cell according to the present invention has been administered.

A method for treating a disease relates to the therapeutic use of the cells of the present invention. In this respect, the cells may be administered to a subject having an existing disease or condition in order to lessen, reduce or improve at least one symptom associated with the disease and/or to slow down, reduce or block the progression of the disease.

The method for preventing a disease relates to the prophylactic use of the cells of the present invention. In this respect, the cells may be administered to a subject who has not yet contracted the disease and/or who is not showing any symptoms of the disease to prevent or impair the cause of the disease or to reduce or prevent development of at least one symptom associated with the disease. The subject may have a predisposition for, or be thought to be at risk of developing, the disease.

The method may involve the steps of:

(i) isolating a cell-containing sample;

(ii) introducing the nucleic acid construct according to the present invention, a first, second and third nucleic acid sequence as defined herein, a vector according to the present invention or a first, second and third vector as herein to the cell; and (v) administering the cells from (ii) to a subject.

Suitably, the nucleic acid construct, vector(s) or nucleic acids may be introduced by transduction. Suitably, the nucleic acid construct, vector(s) or nucleic acids may be introduced by transfection.

Suitably, the cell may be autologous. Suitably, the cell may be allogenic.

The methods provided by the present invention for treating a disease may involve monitoring the progression of the disease and/or any toxic activity.

Suitably, the method may comprise stopping or reducing the administration of an agent as defined herein to the subject in order to reduce adverse toxic effects; or the method may comprise increasing the administration of an agent as defined herein to the subject in order to increase anti-tumour effects.

The agent may be a small molecule. In some embodiments, the agent may be selected from minocycline, tetracycline, doxycycline, or an analogue thereof.

The methods provided by the present invention for treating a disease may involve monitoring the progression of the disease and monitoring any toxic activity and adjusting the dose of the agent administered to the subject to provide acceptable levels of disease progression and toxic activity.

"Monitoring the progression of the disease" means to assess the symptoms associated with the disease over time to determine if they are reducing/improving or increasing/worsening.

"Toxic activity" relates to adverse effects caused by the cells of the invention following their administration to a subject. Toxic activities may include, for example, immunological toxicity, biliary toxicity and respiratory distress syndrome.

As such the dose of the agent administered to a subject, or the frequency of administration, may be altered in order to provide an acceptable level of both disease progression and toxic activity. The specific level of disease progression and toxic activities determined to be 'acceptable' will vary according to the specific circumstances and should be assessed on such a basis.

The agent may be administered in the form of a pharmaceutical composition. The pharmaceutical composition may additionally comprise a pharmaceutically acceptable carrier, diluent or excipient. The pharmaceutical composition may optionally comprise one or more further pharmaceutically active polypeptides and/or compounds. Such a formulation may, for example, be in a form suitable for intravenous infusion.

The present invention provides an engineered cytolytic immune cell according to the present invention, a nucleic acid construct according to the present invention, a first, second and third nucleic acid sequence as defined herein, a vector according to the present invention, or a first, second and third vector according to the present invention for use in treating and/or preventing a disease. In particular the present invention provides an engineered cytolytic immune cell of the present invention for use in treating and/or preventing a disease.

The present invention also relates to an engineered cytolytic immune cell according to the present invention, a nucleic acid construct according to the present invention, a first, second and third nucleic acid sequence as defined herein, a vector according to the present invention, or a first, second and third vector according to the present invention in the manufacture of a medicament for the treatment and/or prevention of a disease. In particular, the invention relates to the use of an engineered cytolytic immune cell according to the present invention in the manufacture of a medicament for the treatment and/or prevention of a disease.

The disease to be treated and/or prevented by the method of the present invention may be cancer.

The cancer may be a cancer such as neuroblastoma, prostate cancer, bladder cancer, breast cancer, colon cancer, endometrial cancer, kidney cancer (renal cell), leukaemia, lung cancer, melanoma, non-Hodgkin lymphoma, pancreatic cancer, and thyroid cancer.

The cell of the present invention may be capable of killing target cells, such as cancer cells.

The target cell may be recognisable by expression of a TAA, for example the expression of a TAA provided above in Table 1. The cancer may be a cancer listed in Table 1.

Method of Making a Cell

Engineered cytolytic immune cells of the present invention may be generated by introducing DNA or RNA coding for the POI, protein interaction domains and intracellular retention domain as defined herein by one of many means including transduction with a viral vector, transfection with DNA or RNA.

The cell of the invention may be made by:

(ii) introducing to a cell (e.g. by transduction or transfection) the nucleic acid construct or vector according to the present invention, or a first, second and third nucleic acid sequence as defined above, or a first, second and third vector as defined above.

Suitably, the cell may be from a sample isolated from a subject.

Method of Controlling Secretion

The present invention also provides a method of controlling the secretion of a POI from a cell.

The method may comprise the steps of:

introducing to a cell a nucleic acid construct according to the present invention, a first, second and third nucleic acid sequence as defined above; a vector according to the present invention or a first, second and third vector as defined above and administering the agent as defined herein to the cell.

The method for controlling the secretion of a POI from a cell, may comprise administering the agent as defined herein to the engineered cytolytic immune cell according to the present invention or to a cell obtainable by the method the present invention.

The present invention further relates to the use of an agent as defined herein, to increase secretion of a POI from an engineered cytolytic immune cell according to the present invention.

Further Aspects of the Invention

The following numbered paragraphs relate to further aspects of the present invention.

1. A peptide selected from the following group: ACPGWARAFC (SEQ ID NO: 34); ACPHWAQAFC (SEQ ID NO: 35); ACPQWAMMFC (SEQ ID NO: 36) and ACPPWAYSFC (SEQ ID NO: 37).

2. A displaceable binding system which comprises:
   a) a domain antibody (dAb) which binds minocycline and has the following complementarity determining regions: CDR1 having the amino acid sequence GRTFSSYN (SEQ ID NO: 38), CDR2 having the amino acid sequence ISWSGART (SEQ ID NO: 39); CDR3 having the amino acid sequence AAGRGWGTEAILDY (SEQ ID NO: 40); and
   b) a peptide according to paragraph 1 which binds the dAb and is displaced by binding of minocycline to the dAb.

3. A chimeric antigen receptor (CAR) system comprising;
   (i) a receptor component comprising an antigen binding domain, a transmembrane domain and a domain antibody (dAb) which binds minocycline and has the following complementarity determining regions: CDR1 having the amino acid sequence GRTFSSYN (SEQ ID NO: 38), CDR2 having the amino acid sequence ISWSGART (SEQ ID NO: 39); CDR3 having the amino acid sequence AAGRGWGTEAILDY (SEQ ID NO: 40); and
   (ii) an intracellular signalling component comprising a signalling domain and a peptide selected from the following group: ACPGWARAFC (SEQ ID NO: 34); ACPHWAQAFC (SEQ ID NO: 35); ACPQWAMMFC (SEQ ID NO: 36) and ACPPWAYSFC (SEQ ID NO: 37) which binds the dAb of the receptor component;
   wherein, binding of the dAb and cyclic peptide is disrupted by the presence of a target compound, such that in the absence of the target compound, the receptor component and the signalling component heterodimerize and binding of the antigen binding domain to antigen results in signalling through the signalling domain; whereas in the presence of the target compound, the receptor component and the signalling component do not heterodimerize and binding of the antigen binding domain to antigen does not result in signalling through the signalling domain.

4. A chimeric antigen receptor (CAR) system comprising;
   (i) an intracellular signalling component comprising a signalling domain and a domain antibody (dAb) which binds minocycline and has the following complementarity determining regions: CDR1 having the amino acid sequence GRTFSSYN (SEQ ID NO: 38), CDR2 having the amino acid sequence ISWSGART (SEQ ID NO: 39); CDR3 having the amino acid sequence AAGRGWGTEAILDY (SEQ ID NO: 40);
   (ii) a receptor component comprising an antigen binding domain, a transmembrane domain and a peptide selected from the following group: ACPGWARAFC (SEQ ID NO: 34); ACPHWAQAFC (SEQ ID NO: 35); ACPQWAMMFC (SEQ ID NO: 36) and ACPPWAYSFC (SEQ ID NO: 37) which binds the dAb of the intracellular signalling component; and
   wherein, binding of the dAb and cyclic peptide is disrupted by the presence of a target compound, such that in the absence of the target compound, the receptor component and the signalling component heterodimerize and binding of the antigen binding domain to antigen results in signalling through the signalling domain; whereas in the presence of the target compound, the receptor component and the signalling component do not heterodimerize and binding of the antigen binding domain to antigen does not result in signalling through the signalling domain.

5. A cell which comprises a CAR system according to paragraph 3 or 4.

6. A nucleic acid construct which encodes a CAR system according to paragraph 3 or 4, which comprises a first nucleic acid sequence encoding the receptor component and a second nucleic acid sequence encoding an intracellular signalling component.

7. A vector comprising a nucleic acid construct according to paragraph 6.

8. A method for making a cell according to paragraph 5, which comprises transducing or transfecting a cell with a nucleic acid construct according to paragraph 6 ex vivo.

9. A pharmaceutical composition comprising a plurality of cells according to paragraph 5.

10. A method for treating cancer which comprises the step of administering a pharmaceutical composition according to paragraph 9 to a subject.

11. A cell according to paragraph 5 in the manufacture of a pharmaceutical composition for use in the treatment of cancer.

12. A pharmaceutical composition according to paragraph 9 for use in treating cancer.

13. A method for inhibiting CAR signalling in a cell according to paragraph 5, which comprises the step of administering minocycline or a derivative thereof to the cell.

14. A method for inhibiting CAR signalling in a subject which comprises a cell according to paragraph 5, which comprises the step of administering minocycline or a derivative thereof to the subject.

This disclosure is not limited by the exemplary methods and materials disclosed herein, and any methods and materials similar or equivalent to those described herein can be used in the practice or testing of embodiments of this disclosure. Numeric ranges are inclusive of the numbers defining the range. Unless otherwise indicated, any nucleic acid sequences are written left to right in 5☐ to 3☐ orientation; amino acid sequences are written left to right in amino to carboxy orientation, respectively.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within this disclosure. The upper and lower limits of these smaller ranges may independently be included or excluded in the range, and each range where either, neither or both limits are included in the smaller ranges is also encompassed within this disclosure, subject to any specifically excluded limit in the stated range. Where the stated range includes one or both of the limits, ranges excluding either or both of those included limits are also included in this disclosure.

It must be noted that as used herein and in the appended claims, the singular forms "a", "an", and "the" include plural referents unless the context clearly dictates otherwise.

The terms "comprising", "comprises" and "comprised of☐ as used herein are synonymous with "including", "includes" or "containing", "contains", and are inclusive or open-ended and do not exclude additional, non-recited members, elements or method steps. The terms "comprising", "comprises" and "comprised of☐ also include the term "consisting of☐.

The publications discussed herein are provided solely for their disclosure prior to the filing date of the present application. Nothing herein is to be construed as an admission that such publications constitute prior art to the claims appended hereto.

The invention will now be further described by way of Examples, which are meant to serve to assist one of ordinary skill in the art in carrying out the invention and are not intended in any way to limit the scope of the invention.

EXAMPLES

Example 1—Generation of Peptides which Bind to Minocycline dAb

A minocycline dAb-Fc was immobilised on beads. The minocycline dAb was encoded by SEQ ID NO: 8. Phage-peptide colony screening was performed with and without 1 µM minocycline.

Peptide library panning identified peptides with displaceable specificity for a minocycline dAb encoded by SEQ ID NO: 8. An antibody comprising SEQ ID NO: 13 was used as a control antibody (the control antibody comprises different CDRs to SEQ ID NO: 8).

Four peptides were identified with displaceable specificity for minocycline dAb. The peptides are: ACPGWARAFC (SEQ ID NO: 34); ACPHWAQAFC (SEQ ID NO: 35); ACPQWAMMFC (SEQ ID NO: 36) and ACPPWAYSFC (SEQ ID NO: 37).

Figure 4:
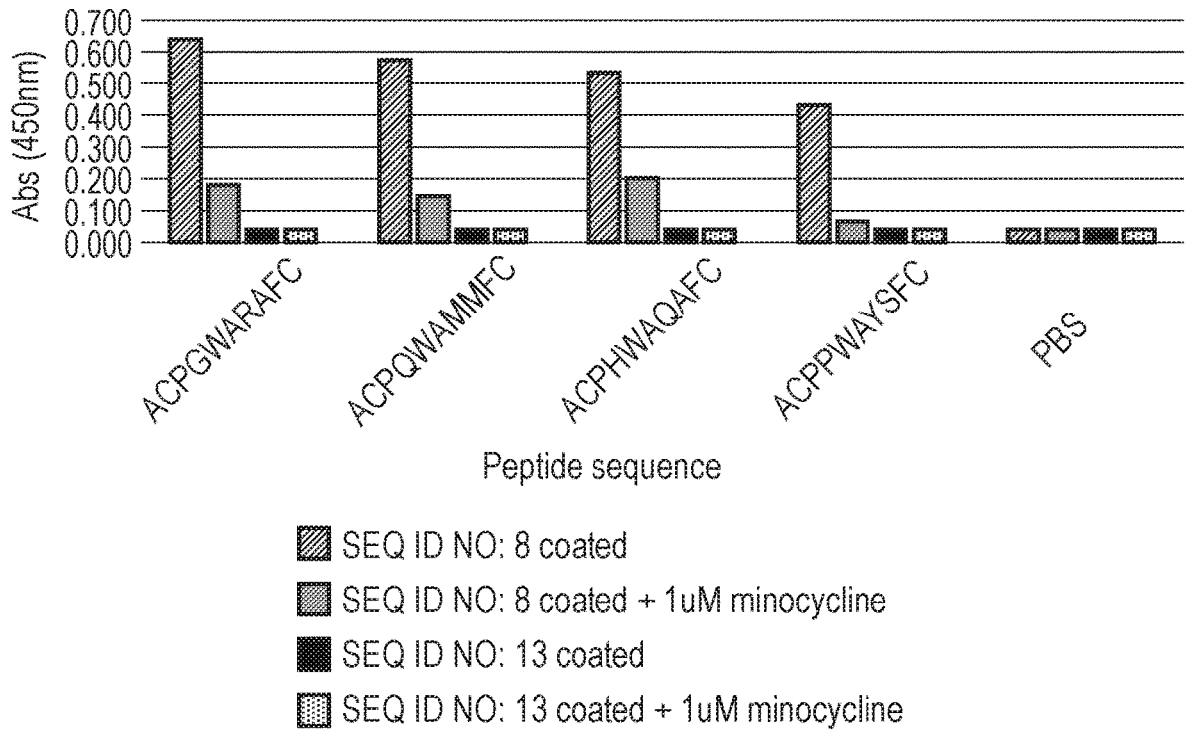
FIG. 4—Graphs showing minocycline displaceable binding of peptides SEQ ID NO: 34, SEQ ID NO: 35, SEQ ID NO: 36 and SEQ ID NO: 37 to minocycline dAb (SEQ ID NO: 8) versus control antibody (SEQ ID NO: 13).

The results of binding experiments using each of these peptides are shown in FIG. 4.

Example 2—Controlled Secretion of IL12 by KDEL-Tagged dAb and Minocycline-Dissociating Peptide A platform was generated consisting of a dAb with affinity for minocycline and several peptides that can bind to the dAb but will dissociate in the presence of minocycline (SEQ ID NO: 34-SEQ ID NO: 37).

The KDEL amino acid sequence was used to retain proteins within the ER/Golgi apparatus. The minocycline specific dAb was tagged with the KDEL sequence (SEQ ID NO: 29) thus anchoring it within with the ER/Golgi and a molecule of interest (IL12) is in turn tagged with the peptide with affinity to the dAb causing its retention. Upon addition of minocycline, the dAb-peptide complex dissociates enabling secretion of the peptide-tagged molecule.

A set of constructs were designed to test this hypothesis using IL12 fused to the minocycline peptide mimic. IL12 is both a molecule of interest in its own right due its proliferative effect on T-cells and a convenient model of a secreted protein, which can be assayed by ELISA analysis from cell supernatants.

Method

HEK293T cells were seeded at $3\times10^6$ in 96-well plates to achieve confluency of 50-60% for next day transfection. A transfection master mix was made by adding 30 μL of GeneJuice transfection reagent to 470 μL plain IMDM and incubating for 5 minutes. For each well, 0.13 μg of plasmid DNA was then added to 5.2 uL of the IMDM-Genejuice master mix and incubated for 15 minutes. Transfection mix containing the GeneJuice-DNA complex was then added to the cells. All incubations were carried out at room temperature.

The following constructs were tested:
Control (NT): no construct (i.e. background levels of 1L12).
Construct labelled 'WARA-IL12+aMinoKDEL': encoding minocycline peptide mimic (SEQ ID NO: 34) and Flexi-IL12 (SEQ ID NO: 19) and a minocycline dAB (SEQ ID NO: 8) with a KDEL sequence.
Construct labelled 'WAYS-IL12+aMinoKDEL': encoding minocycline peptide mimic (SEQ ID NO: 37) and Flexi-IL12 (SEQ ID NO: 19) and a minocycline dAB (SEQ ID NO: 8) with a KDEL sequence.
Construct labelled 'WARA-IL12+aMino': encoding minocycline peptide mimic (SEQ ID NO: 34) and Flexi-IL12 (SEQ ID 25 NO: 19) and a minocycline dAB (SEQ ID NO: 8) without a KDEL sequence.
Construct labelled 'WAYS-IL12+aMino': encoding minocycline peptide mimic (SEQ ID NO: 37) and Flexi-IL12 and a minocycline dAB (SEQ ID NO: 8) without a KDEL sequence.

48 hours post transfection, sacrificial wells containing transfected cells were tested for transfection efficiency by staining cells using FITC anti-HA antibody (Biolegend, 901507). Upon confirmation of transfection, culture media was removed from cells and fresh media supplemented with minocycline at varying concentrations was added. 2 and 4 hours post minocycline addition, IL12 ELISA was carried out following manufacturers instructions (BioLegend, 431704)

Results

All results were normalised using IL12 standard curve as provided as part of the ELISA kit.

Figure 5A:
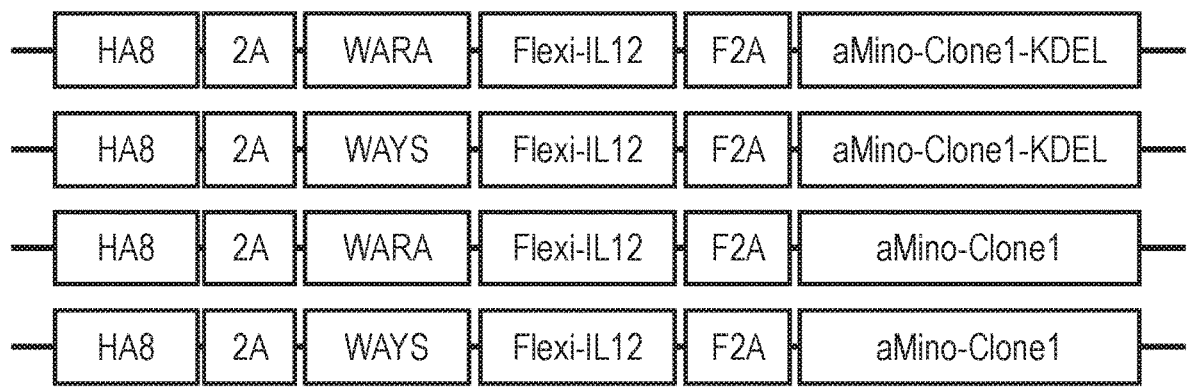
FIGS. 5A, 5B and 5C—Minocycline induced secretion of ER retained IL12 HEK293T cells were transiently transfected with constructs expressing the intracellular KDEL tagged anti-minocycline dAb and dAb-specific peptide (GWARA or PWAYS) tagged IL-12 (A). Transfection efficiency determined by staining for HA marker expression with transfection efficiency ranging from 50-70% (B). Culture media was removed and replaced with fresh media containing varying concentrations of minocycline (0, 1 uM and 10 uM). Supernatant was collected 2 and 4 hours post minocycline addition and IL12 ELISA readout carried out (C).
Figure 5B:
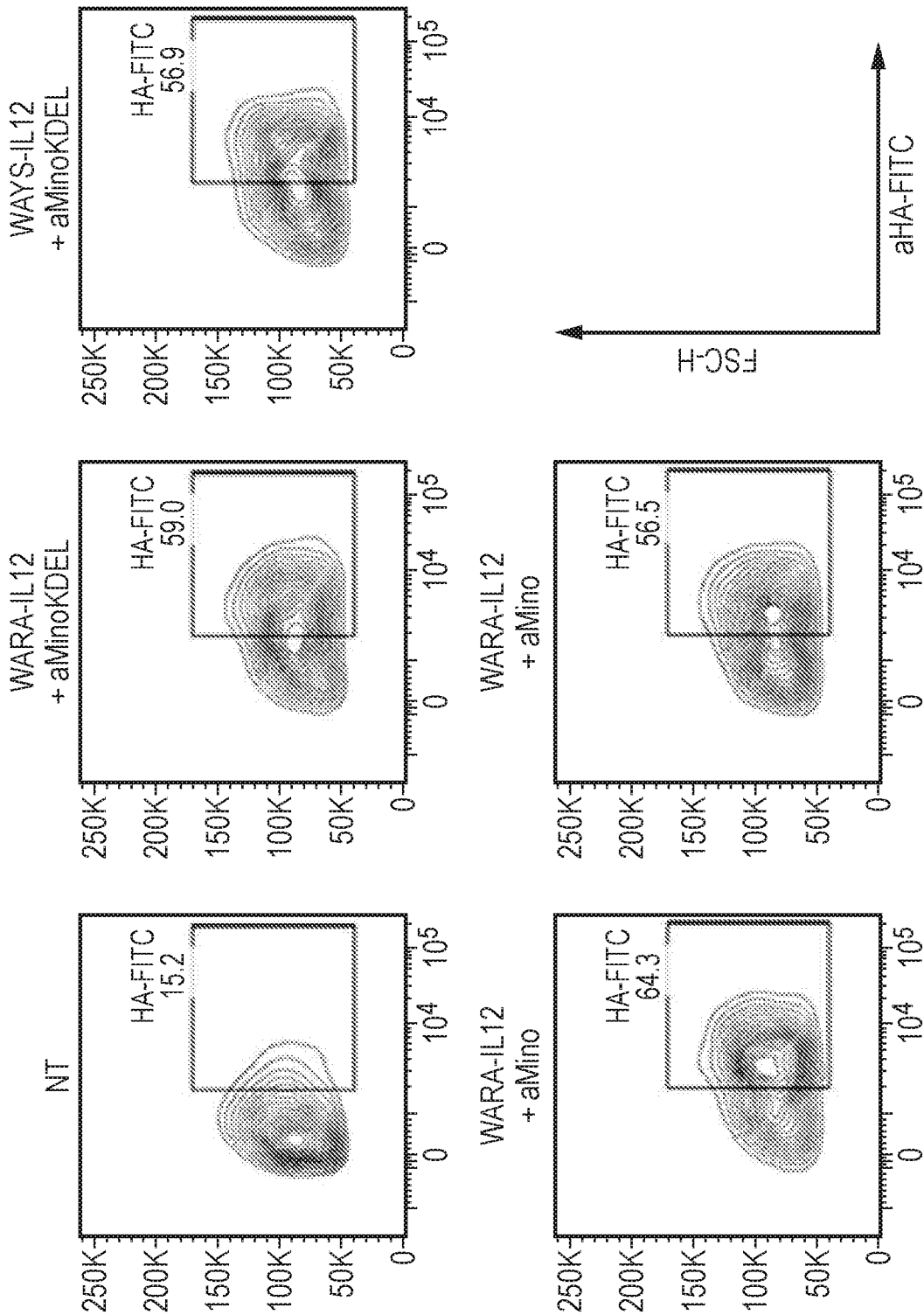
Figure 5C:
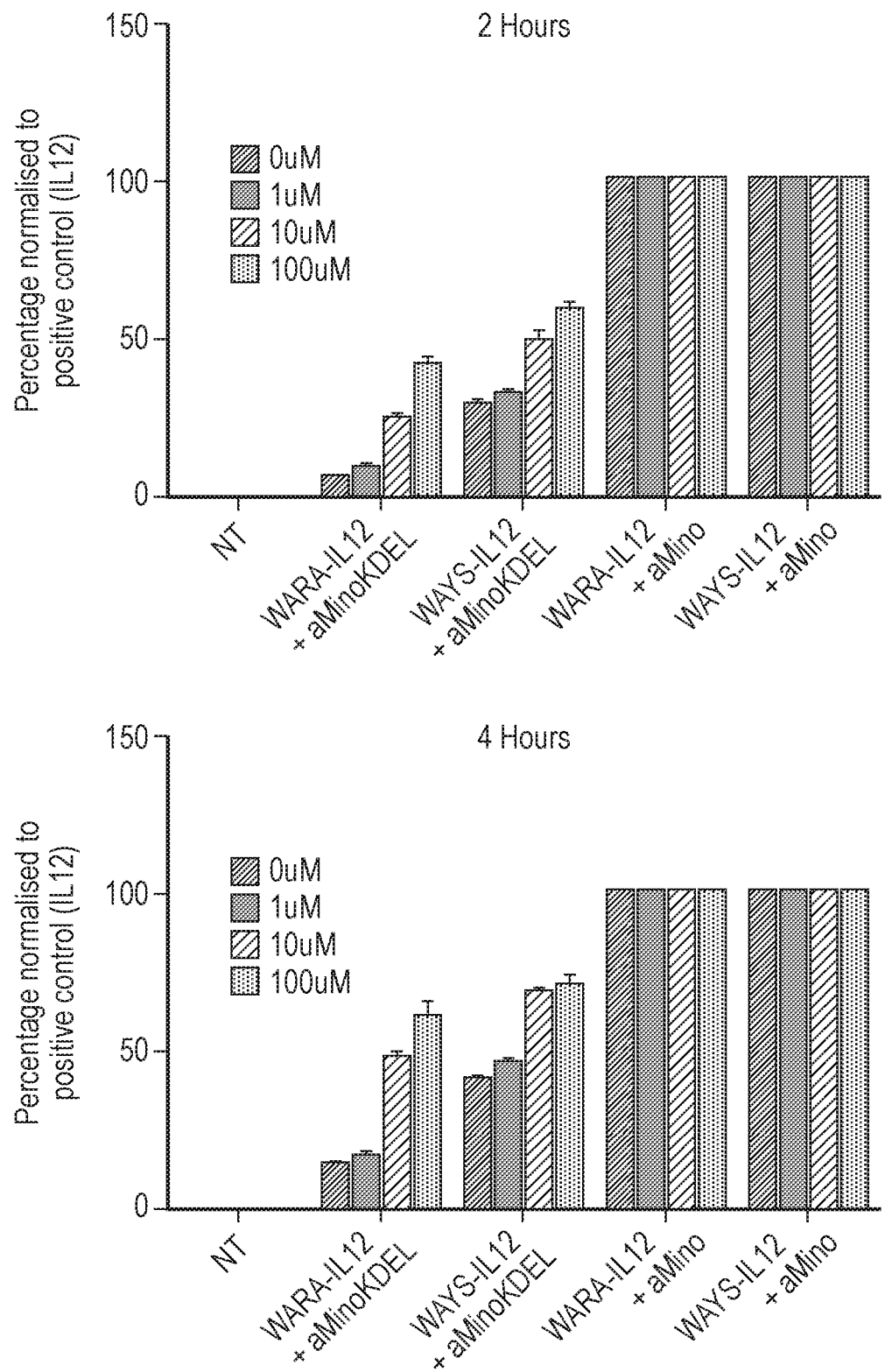
Figure 6:
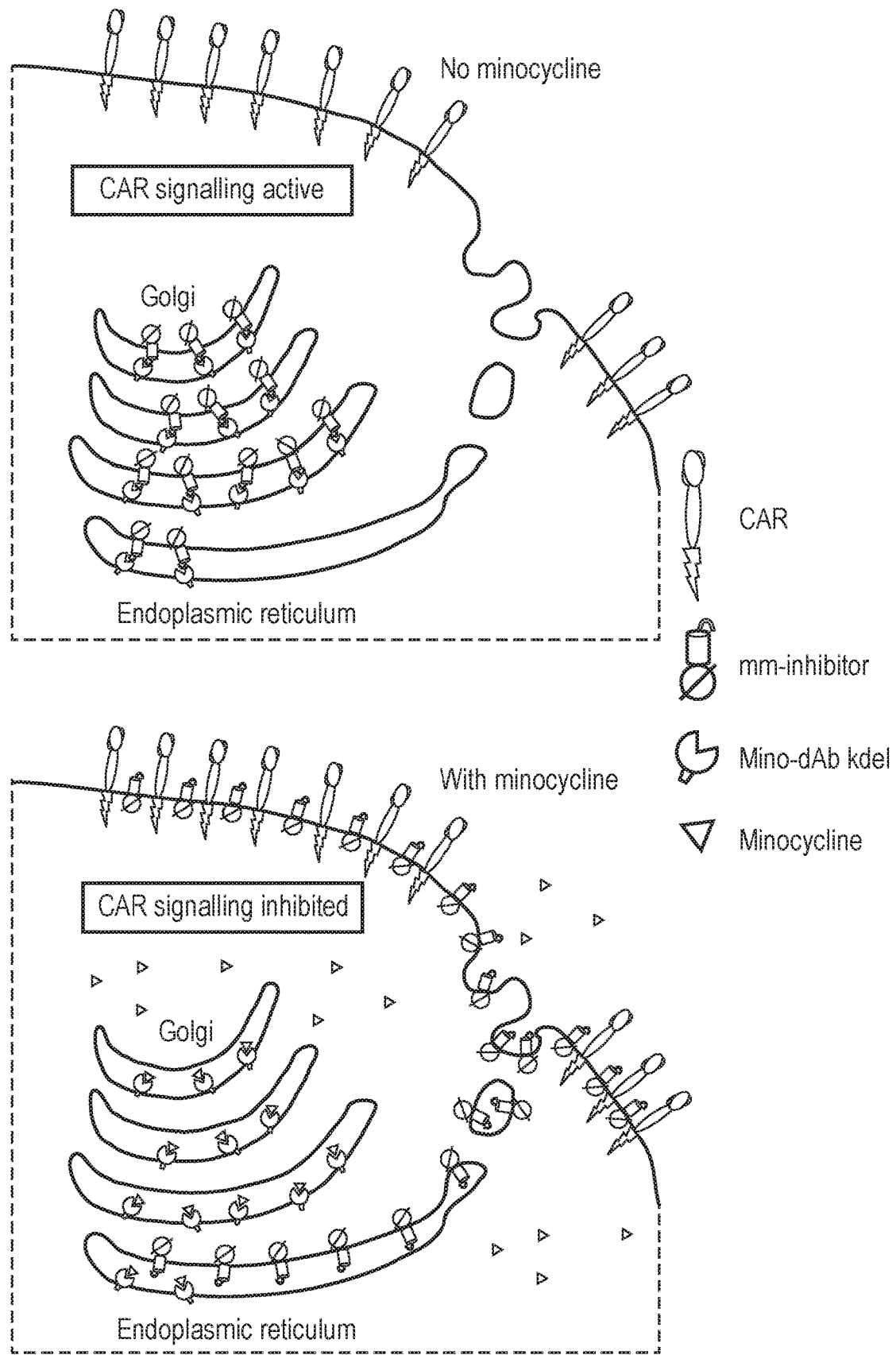
FIG. 6—Schematic showing an embodiment of the present invention comprising a dampener.
Figure 7:
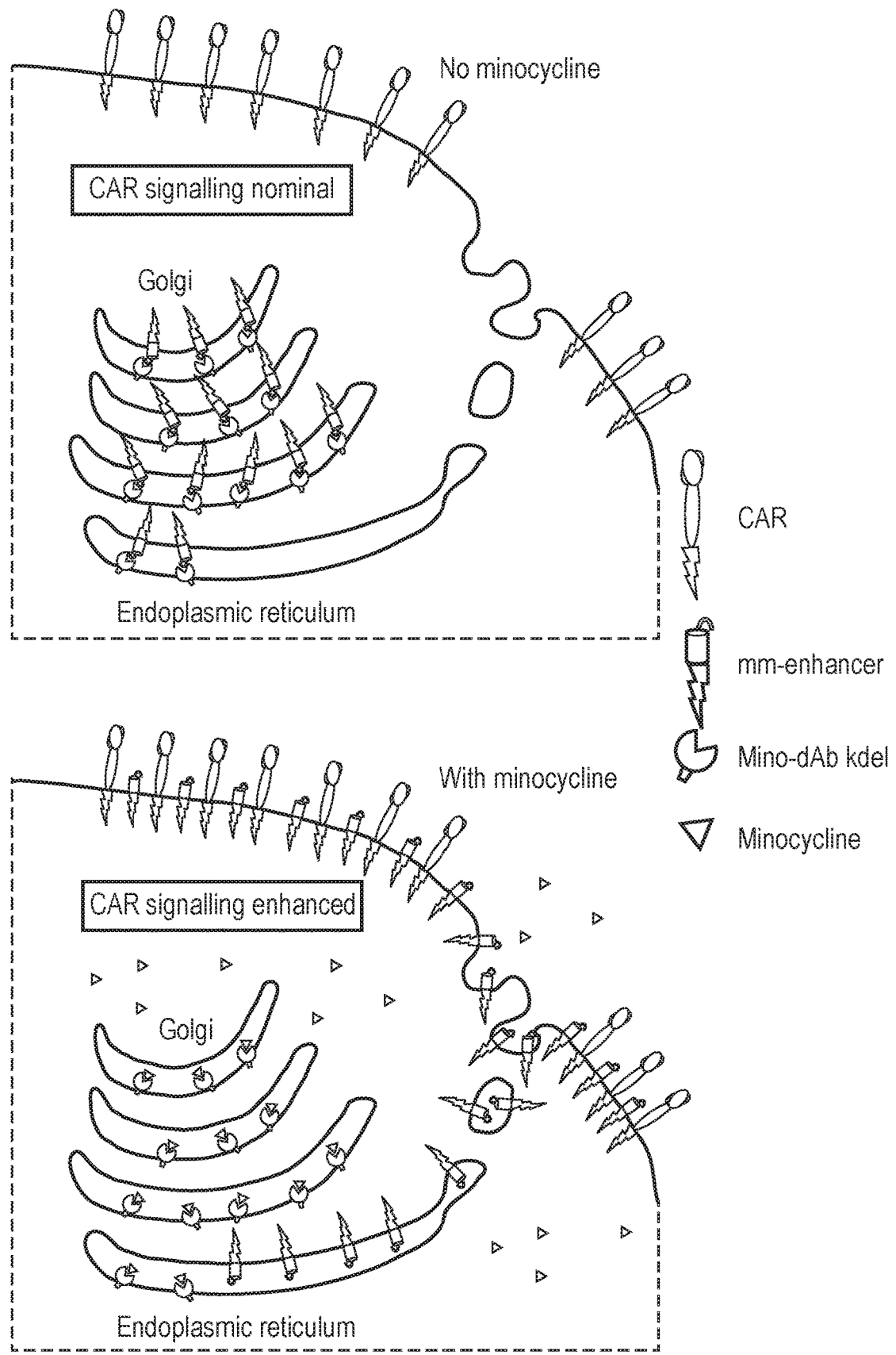
FIG. 7—Schematic showing an embodiment of the present invention comprising an enhancer.

The results (shown in FIG. 5) show that IL12 secretion is not affected by presence of the peptide tag due to its high expression. Non Transduced cells produced no IL12 under any conditions or time point removing the need to calculate and subtract IL12 background and showing there was minimal noise in the assay.

IL12 fused to the two peptides WARA SEQ ID NO: 34 (high affinity) and WAYS SEQ ID NO: 37 (low affinity) in the presence of KDEL anchored minocycline dAb show a concentration dependent increase of IL12 secretion from 0 µM to 100 µM at all time points.

Example 3—In Vitro Testing of Control of Secretion by Retention

T-cells are transduced to express a CD19 CAR, CD19CAR-2A-flexiIL-12 (which provides constitutive expression of IL-12) and CD19CAR-2A-TiP-FlexiIL12-2A-S-TetR-sekdel (which provides tuneable expression of IL-12). The T-cells are cultured in different concentrations of minocycline. Supernatant is harvested after 48 hours and IL-12 is quantified using an enzyme-linked immunosorbent assay (ELISA).

The functional properties of the different CAR T-cells are quantified using standard co-culture methods with CD19 targets and their function determined by flow-cytometry and cytokine release in the presence of different concentrations of minocycline.

Example 4—In Vivo Testing of Control of Secretion by Retention

NOD scid gamma (NSG) mice are engrafted with Raji cells by tail-vein injection. T-cells as transduced in Example 1 are administered to the mice via tail-vein injection. As well as receiving different CAR T-cells, mice are further split into cohorts which receive different concentration of minocycline by intraperitoneal injection. Mice are bled via tail vein injection and serum IL-12 is quantified using ELISA.

All publications mentioned in the above specification are herein incorporated by reference. Various modifications and variations of the described methods and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in molecular biology or related fields are intended to be within the scope of the following claims.

The invention claimed is:

1. A minocycline-binding domain antibody of SEQ ID NO: 8, 9, 10, 11, 12 or 13.
2. A nucleic acid encoding a domain antibody according to claim 1.
3. A vector comprising a nucleic acid according to claim 2.
4. A host cell comprising a vector according to claim 3.
5. The cell according to claim 4, wherein the cell is a T cell or an NK cell.
6. A pharmaceutical composition comprising a plurality of cells according to claim 5.

* * * * *